(12) United States Patent
Taki et al.

(10) Patent No.: US 10,747,499 B2
(45) Date of Patent: Aug. 18, 2020

(54) INFORMATION PROCESSING SYSTEM AND INFORMATION PROCESSING METHOD

(71) Applicant: SONY CORPORATION, Tokyo (JP)

(72) Inventors: Yuhei Taki, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 47 days.

(21) Appl. No.: 15/558,265

(22) PCT Filed: Jan. 14, 2016

(86) PCT No.: PCT/JP2016/050905
§ 371 (c)(1),
(2) Date: Sep. 14, 2017

(87) PCT Pub. No.: WO2016/152200
PCT Pub. Date: Sep. 29, 2016

(65) Prior Publication Data
US 2018/0081622 A1    Mar. 22, 2018

(30) Foreign Application Priority Data
Mar. 23, 2015 (JP) .................... 2015-059565

(51) Int. Cl.
*G06F 3/16* (2006.01)
*G10L 15/26* (2006.01)
(Continued)

(52) U.S. Cl.
CPC .............. *G06F 3/167* (2013.01); *G10L 15/08* (2013.01); *G10L 15/22* (2013.01); *G10L 15/26* (2013.01);
(Continued)

(58) Field of Classification Search
CPC .... G06F 17/2247; G06F 17/24; G06F 17/277; G06F 17/2264; G06F 17/3089;
(Continued)

(56) References Cited

U.S. PATENT DOCUMENTS

2002/0184016 A1\* 12/2002 Hartley .................. G10L 15/08
704/235
2007/0061152 A1    3/2007 Doi
(Continued)

FOREIGN PATENT DOCUMENTS

CN         1932807 A       3/2007
JP      2000-020092 A      1/2000
(Continued)

OTHER PUBLICATIONS

International Search Report and Written Opinion of PCT Application No. PCT/JP2016/050905, dated Feb. 9, 2016, 10 pages of ISRWO.

*Primary Examiner* — Quoc A Tran
(74) *Attorney, Agent, or Firm* — Chip Law Group

(57) ABSTRACT

It is desirable to provide technology capable of allowing a user to input information more flexibly. Provided is an information processing system including a mode control portion that switches an information input mode from a character-unit input mode to a phrase-unit input mode in a case where a predetermined first trigger is detected when the character-unit input mode is executed as the information input mode.

17 Claims, 22 Drawing Sheets

(51) Int. Cl.
*G10L 15/08* (2006.01)
*G10L 15/22* (2006.01)
*G06Q 10/10* (2012.01)
*G06Q 10/06* (2012.01)
*G06Q 30/02* (2012.01)
*H04L 29/06* (2006.01)
*G06F 3/0488* (2013.01)
*G06F 3/0484* (2013.01)
*G06F 17/00* (2019.01)

(52) U.S. Cl.
CPC ........ *G06F 3/0488* (2013.01); *G06F 3/04842* (2013.01); *G06F 3/04883* (2013.01); *G06F 3/04886* (2013.01); *G06Q 10/06* (2013.01); *G06Q 10/109* (2013.01); *G06Q 30/02* (2013.01); *G10L 2015/088* (2013.01); *H04L 67/42* (2013.01)

(58) Field of Classification Search
CPC .. G06F 17/30864; G06F 3/0482; G06F 3/167; G06F 17/276; G06F 3/04886; G06F 3/04883; G06Q 10/109; G06Q 10/07; G06Q 10/09; G06Q 10/06; G06Q 30/02; H04L 67/42; G10L 15/22; G10L 15/26
See application file for complete search history.

(56) References Cited

U.S. PATENT DOCUMENTS

| | | | |
|---|---|---|---|
| 2009/0234632 A1* | 9/2009 | Hasegawa | G06F 3/018 704/1 |
| 2012/0016678 A1* | 1/2012 | Gruber | G10L 15/22 704/275 |
| 2014/0359513 A1* | 12/2014 | Starner | G06F 3/04886 715/773 |
| 2015/0133197 A1* | 5/2015 | Kwak | H04M 1/72519 455/563 |

FOREIGN PATENT DOCUMENTS

| | | |
|---|---|---|
| JP | 2001-042892 A | 2/2001 |
| JP | 2007-080097 A | 3/2007 |
| JP | 2014-016402 A | 1/2014 |

* cited by examiner

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2016/050905 filed on Jan. 14, 2016, which claims priority benefit of Japanese Patent Application No. JP 2015-059565 filed in the Japan Patent Office on Mar. 23, 2015. Each of the above-referenced applications is hereby incorporated herein by reference in its entirety.

TECHNICAL FIELD

The present disclosure relates to an information processing system and an information processing method.

BACKGROUND ART

In recent years, various techniques for reducing load on the user who inputs information have been developed. In one example, a technique is developed for dividing a sentence input by the user and inserting it in a predetermined field or modifying it (e.g., see Patent Literature 1). In addition, as a format of information input, a format of inputting information in units of one character has become widespread.

CITATION LIST

Patent Literature

Patent Literature 1: JP 2012-053634A

DISCLOSURE OF INVENTION

Technical Problem

However, in a case where the user typically inputs information in units of one character, it is difficult for the user to input information flexibly. Thus, it is desirable to provide technology capable of allowing the user to input information more flexibly.

Solution to Problem

According to the present disclosure, there is provided an information processing system including: a mode control portion configured to switch an information input mode from a character-unit input mode to a phrase-unit input mode in a case where a predetermined first trigger is detected when the character-unit input mode is executed as the information input mode.

According to the present disclosure, there is provided an information processing method including: switching, by a processor, an information input mode from a character-unit input mode to a phrase-unit input mode in a case where a predetermined first trigger is detected when the character-unit input mode is executed as the information input mode.

Advantageous Effects of Invention

According to the present disclosure as described above, there is provided technology capable of allowing the user to input information more flexibly. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
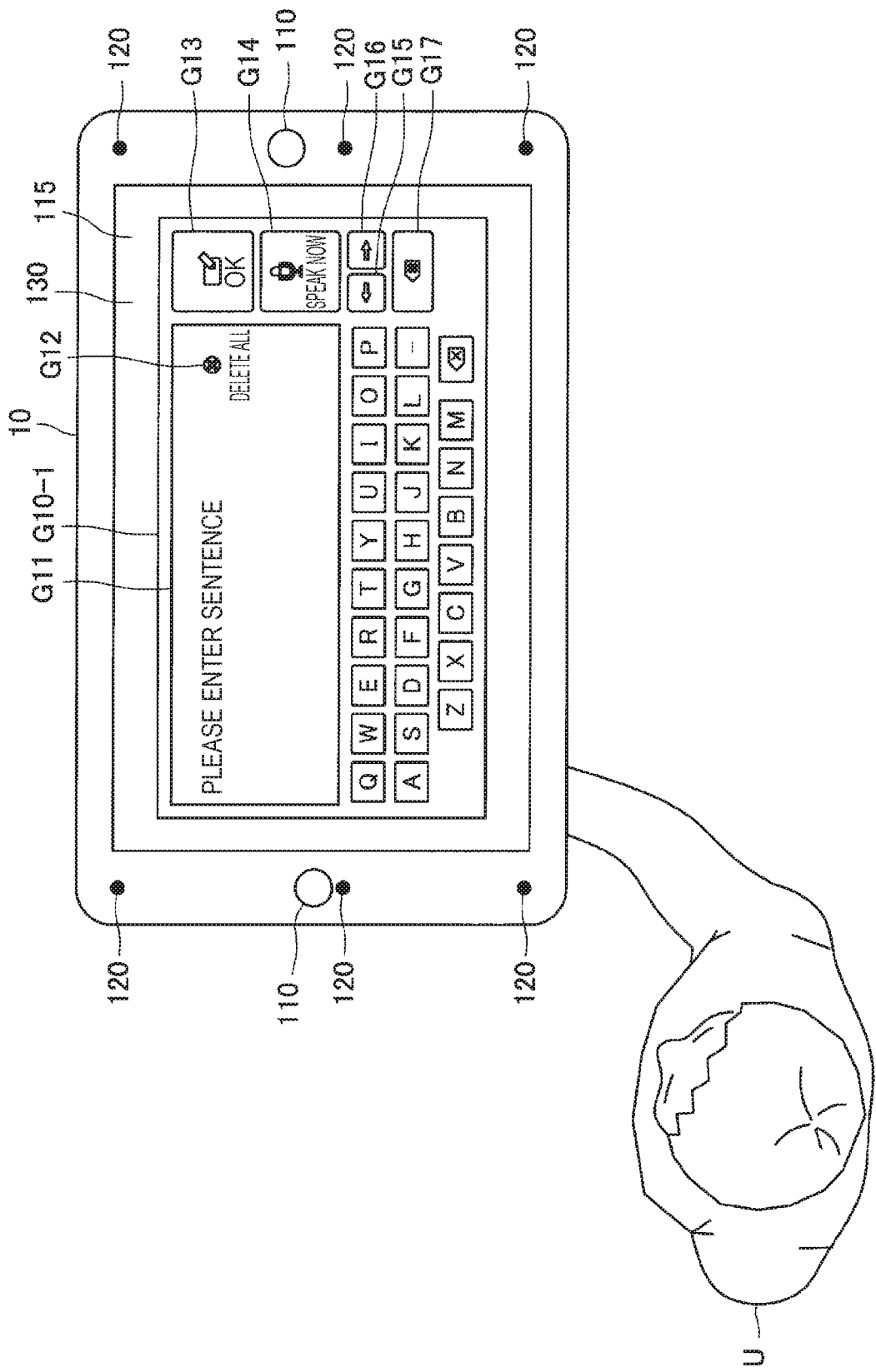
FIG. 1 is a diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated description of these structural elements is omitted.

Note that, in this description and the drawings, structural elements that have substantially the same function and structure are sometimes distinguished from each other using different numerals after the same reference sign. However, when there is no need in particular to distinguish structural elements that have substantially the same function and structure, the same reference sign alone is attached.

Moreover, the description will be given in the following order.

1. Embodiment of present disclosure
1.1. System configuration example
1.2. Functional configuration example
1.3. Function details of information processing system
1.4. Modified example of system configuration
1.5. Hardware configuration example
2. Conclusion

1. EMBODIMENT OF PRESENT DISCLOSURE

[1.1. System Configuration Example]

A configuration example of an information processing system 10 according to an embodiment of the present disclosure is described with reference to the drawings. FIG. 1 is a diagram illustrating a configuration example of the information processing system 10 according to an embodiment of the present disclosure. As illustrated in FIG. 1, the information processing system 10 according to the embodiment of the present disclosure is configured to include an image input portion 110, an operation input portion 115, a sound collection portion 120, and an output portion 130. The information processing system 10 is capable of performing speech recognition processing on the speech uttered by a user U (hereinafter also simply referred to as "user").

In the example illustrated in FIG. 1, although the information processing system 10 is a tablet terminal, the type of the information processing system 10 is not limited to a particular one. In one example, the information processing system 10 may be a smartphone or cellular phone. Alternatively, the information processing system 10 may be game consoles or the like, which will be described later. The terms "speech" (or voice) and "sound" are used herein as different terms.

The image input portion 110 has a function of inputting an image. In the example illustrated in FIG. 1, the image input portion 110 includes two cameras embedded in the information processing system 10. However, the number of cameras included in the image input portion 110 is not limited to the particular number as long as it is one or more. In such a case, the position where each of one or more cameras included in the image input portion 110 is provided is also not limited to a particular position. In addition, one or more cameras may include a monocular camera or a stereo camera.

The operation input portion 115 has a function of inputting an operation by the user U. In the example illustrated in FIG. 1, the operation input portion 115 includes a touch panel. The type employed in the touch panel is not limited to a particular type, and it may be electrostatic capacitive, resistance film, infrared, or ultrasonic. In addition, the operation input portion 115 may be not necessarily a touch panel as long as it has a function of inputting an operation by the user U, that is, it may be a camera or a hardware button.

The output portion 130 has a function of displaying a screen. In the example illustrated in FIG. 1, the output portion 130 is arranged on top of the operation input portion 115, and the corresponding positions between the operation input portion 115 and the output portion 130 overlap with each other. However, the position where the output portion 130 is provided is not limited to a particular position. In addition, the output portion 130 typically may be a liquid crystal display, an organic electro-luminescence (EL) display, or the like, but may be other types of display as long as it has a function of displaying a screen.

The sound collection portion 120 has a function of obtaining sound information by sound collection. In the example illustrated in FIG. 1, the sound collection portion 120 includes six microphones in total, that is, three microphones at the upper end of the tablet terminal and three microphones at the lower end of the tablet terminal. However, the number of microphones included in the sound collection portion 120 is not limited to a particular number as long as it is one or more. In addition, the position where each of one or more microphones included in the sound collection portion 120 is provided is also not limited to a particular position.

However, the sound collection portion 120 including a plurality of microphones allows the arrival direction of sound to be estimated on the basis of sound information obtained through sound collection by the plurality of microphones. When the sound collection portion 120 includes a directivity microphone, the arrival direction of the sound can be estimated on the basis of the sound information obtained by the directivity microphone.

The above description is given as to the configuration example of the information processing system 10 according to an embodiment of the present disclosure.

[1.2. Functional Configuration Example]

Figure 2:
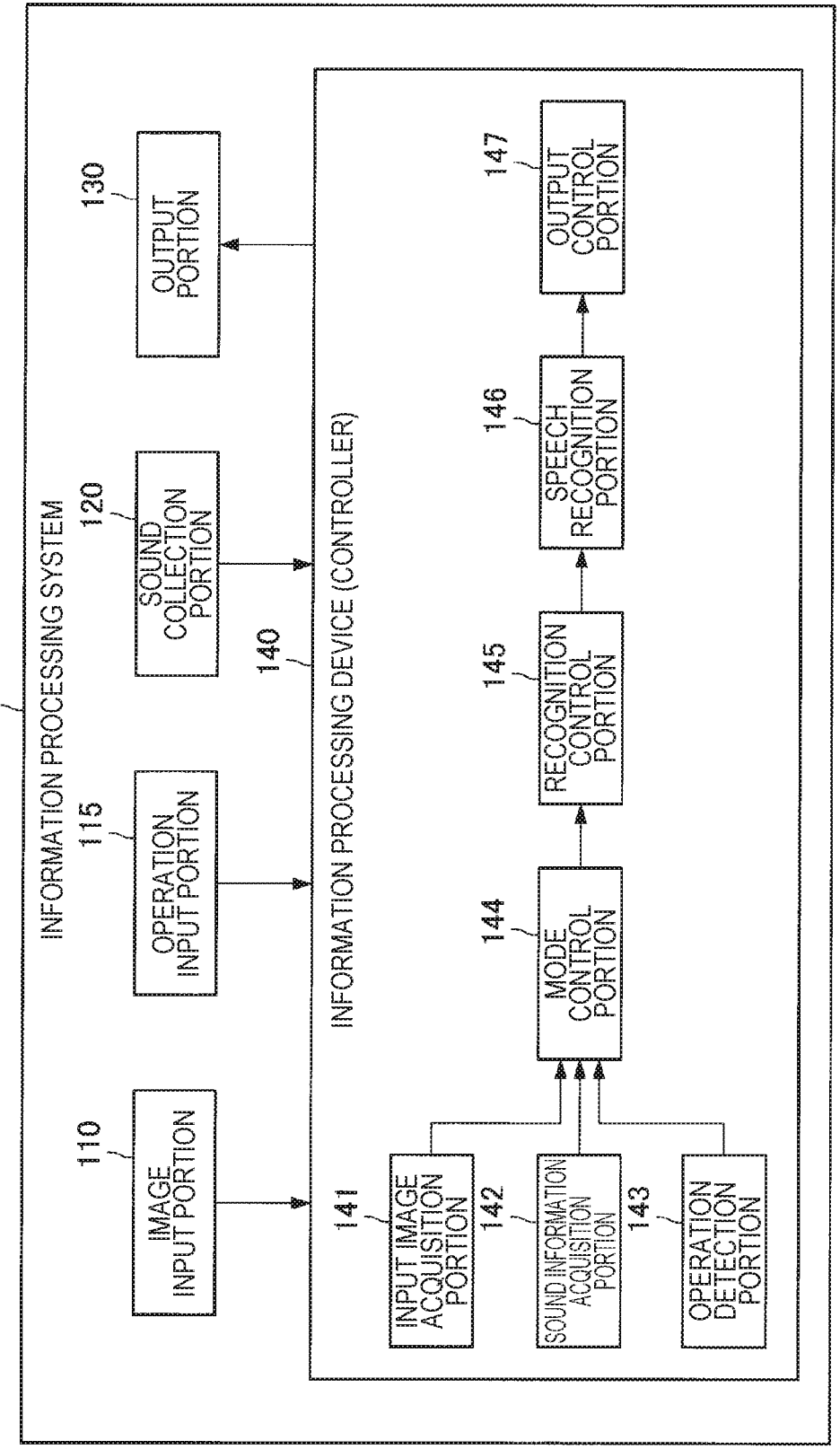
FIG. 2 is a block diagram illustrating a functional configuration example of the information processing system according to the present embodiment.

Subsequently, a functional configuration example of the information processing system 10 according to an embodiment of the present disclosure is described. FIG. 2 is a block diagram illustrating a functional configuration example of the information processing system 10 according to an embodiment of the present disclosure. As illustrated in FIG. 2, the information processing system 10 according to an embodiment of the present disclosure is configured to include the image input portion 110, the operation input portion 115, the sound collection portion 120, the output portion 130, and an information processing device 140 (hereinafter also referred to as "controller 140").

The information processing device 140 executes control of each component of the information processing system 10. In one example, the information processing device 140 generates information to be output from the output portion 130. In addition, in one example, the information processing device 140 incorporates the information, which is input by each of the image input portion 110, the operation input portion 115, and the sound collection portion 120, in the information to be output from the output portion 130. As illustrated in FIG. 2, the information processing device 140 is configured to include an input image acquisition portion 141, a sound information acquisition portion 142, an operation detection portion 143, a mode control portion 144, a recognition control portion 145, a speech recognition portion 146, and an output control portion 147. Details of each of these functional blocks will be described later.

Moreover, the information processing device 140 may be composed of, for example, a central processing unit (CPU). In the case where the information processing device 140 is composed of a processing device such as CPU, this processing device can be composed of an electronic circuit.

The above description is given as to the functional configuration example of the information processing system 10 according to an embodiment of the present disclosure.

[1.3. Function Details of Information Processing System]

Subsequently, functions of the information processing system 10 according to an embodiment of the present disclosure are described in detail. In an embodiment of the present disclosure, in a case where a predetermined first trigger is detected when the character-unit input mode is executed as the information input mode, the mode control portion 144 switches the information input mode from the character-unit input mode to the phrase-unit input mode. This configuration makes it possible to switch automatically the information input mode from the character-unit input mode to the phrase-unit input mode upon detection of the first trigger, thereby allowing the user to input information more flexibly.

In this regard, the first trigger is not limited to a particular one, and may include, in one example, a predetermined speech input start trigger. The speech input start trigger is not limited to a particular one, and may include, in one example, a predetermined speech input start operation by the user. The speech input start operation is not limited to a particular one, and may be, in one example, an operation of depressing a speech input start button (e.g., an operation of depressing a speech input start operation object displayed by the output portion 130 and an operation of depressing a hardware button used to start speech input).

Alternatively, the speech input start operation may be an operation of executing a predetermined speech input start command (e.g., an utterance, "speech"). Alternatively, the speech input start operation may be a predetermined speech input start gesture (e.g., swing hand up, swing hand down, motion of face (e.g., nodding and tilting the face to the left and right)). Alternatively, the speech input start operation may be a predetermined speech input start motion (e.g., swing the information processing system 10 up and swing the information processing system 10 down) given to the information processing system 10.

Further, the speech input start trigger may include an event in which sound information having speech likeness exceeding a threshold is acquired from the sound collection portion 120. A case where the speech input start trigger is a speech input start operation, in particular, a case where the speech input start operation object displayed on the output portion 130 is depressed will be described as an example. In other words, when the operation detection portion 143 detects an operation of depressing the speech input start operation object, speech input is started.

The technique of evaluating speech likeness from sound information is not limited to a particular technique. In one example, as the technique of evaluating speech likeness from sound information, it is also possible to employ the technique disclosed in Patent Literature (JP 2010-038943A). In addition, in one example, as the technique of evaluating speech likeness from sound information, it is also possible to employ the technique disclosed in Patent Literature (JP 2007-328228A). An example in which the mode control portion 144 evaluates speech likeness will be described herein, but a server (not illustrated) may evaluate speech likeness.

On the other hand, in a case where a predetermined second trigger is detected when the phrase-unit input mode is executed as the information input mode, the mode control portion 144 switches the information input mode from the phrase-unit input mode to the character-unit input mode. This configuration makes it possible to switch automatically the information input mode from the phrase-unit input mode to the character-unit input mode upon detection of the second trigger, thereby allowing the user to input information more flexibly.

Here, the second trigger is not limited to a particular one, and may include, in one example, a predetermined speech input end trigger. The speech input end trigger is not limited to a particular one, and may include, in one example, a predetermined speech input end operation by the user. The speech input end operation is not limited to a particular one, and may be, in one example, an operation of depressing a speech input end button (e.g., an operation of depressing a speech input end operation object displayed by the output portion 130 and an operation of depressing a hardware button used to end a speech input).

Alternatively, the speech input end operation may be an operation of executing a predetermined speech input end command (e.g., utterance of "Qwerty"). Alternatively, the speech input end operation may be a predetermined speech input end gesture (e.g., a gesture that does not overlap with the speech input start gesture among gestures listed as an example of the speech input start gesture). Alternatively, the speech input end operation may be a predetermined speech input end motion (e.g., motion that does not overlap with the speech input start motion among motions listed as an example of the speech input start motion) given to the information processing system 10.

Alternatively, the speech input end trigger may include an event in which speech recognition processing is completed. The speech recognition processing may be completed when a predetermined time is elapsed from the start of the speech recognition processing. Alternatively, the speech recognition processing may be completed when the time during which the volume of the sound information acquired from the sound collection portion 120 falls below a predetermined threshold exceeds a predetermined duration after the start of the speech recognition processing. A case where the speech input end trigger is the completion of the speech recognition processing is described below as an example. In other words, when the speech recognition processing is completed, speech input is ended.

A phrase is composed of one or more words, and the phrase is preferably delimited by units that are easy for the user to speak. In one example, a phrase may include a clause, or may include a group obtained by connecting a phrase or a clause in accordance with a predetermined rule. Here, the predetermined rule is not limited to a particular one, and it includes a rule in which phrases before and after punctuation mark are not connected, a rule in which a prepositional phrase is necessary to connect with the previous phrase, and a rule in which a noun phrase and a verb phrase after the noun phrase are connected. In addition, the connection between phrases may be changed dynamically depending on the surrounding environment such as noise.

The format of information input in each of the character-unit input mode and the phrase-unit input mode is not limited to a particular format. However, if the information to be input is short as in the case of information input in units of characters, it is conceivable that the speech recognition processing on the user-uttered speech is likely to fail and it is difficult for the user to speak. Thus, it is assumed that, when the character-unit input mode is executed as the information input mode, the output control portion 147 controls the output portion 130 so that the output portion 130 outputs the input information obtained from the operation input portion 115 in units of characters. This case will be mainly described below.

Further, if the information to be input is long as in the case of information input in units of phrases, it is conceivable that the speech recognition processing on the user-uttered speech is likely to be successful, while the operation on the operation input portion 115 is likely to be complicated. Thus, when a predetermined speech input mode included in the phrase-unit input mode is executed as the information input mode, the recognition control portion 145 controls the speech recognition portion 146 so that the speech recognition portion 146 may perform the speech recognition processing on the sound information acquired from the sound collection portion 120.

Then, it is assumed that, when the speech input mode included in the phrase-unit input mode is executed as the information input mode, the output control portion 147 controls the output portion 130 so that the output portion 130 may output a result of the speech recognition processing in units of phrases. This case will be mainly described below. Moreover, the speech input mode is not limited to a particular mode as long as it necessitates a speech input, and it corresponds to "phrase-unit insertion mode" and "phrase-unit overwrite mode" in the example described later.

Figure 3:
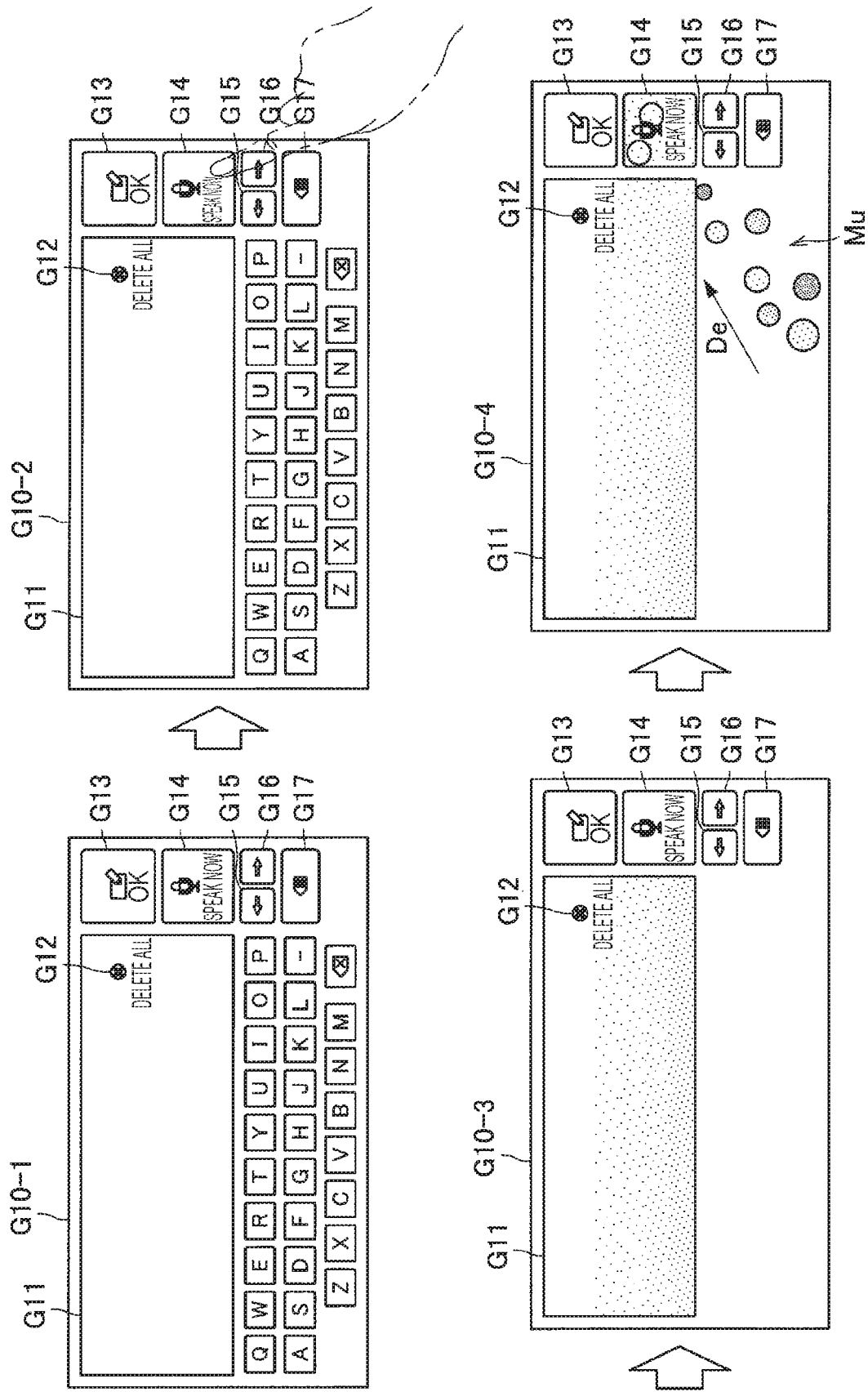
FIG. 3 is a diagram illustrating an example of a screen displayed in each of a character-unit input mode and a phrase-unit input mode.

FIG. 3 is a diagram illustrating an example of a screen displayed in each of the character-unit input mode and the phrase-unit input mode. As illustrated in FIG. 3, in a case where the character-unit input mode is executed as the information input mode at the start of character input, the output control portion 147 causes a character-unit input screen G10-1 to be displayed. The character-unit input screen G10-1 includes a speech input start operation object G14 used to start a speech input and a display field G11 that is a display field of input information. The output control portion 147 causes the display field G11 to display the input information obtained from the operation input portion 115 (e.g., a keyboard on the character-unit input screen G10-1) in units of characters.

Further, the character-unit input screen G10-1 includes a delete-all operation object G12 used to delete all the information displayed in the display field G11 and a decision operation object G13 used to decide the information displayed in the display field G11. In addition, the character-unit input screen G10-1 includes a backward movement operation object G15, a forward movement operation object G16, and a deletion operation object G17. The backward movement operation object G15 is used to return the cursor position in the display field G11 to the back, the forward movement operation object G16 is used to advance the cursor position in the display field G11 to the front, and the deletion operation object G17 is used to delete the character or word at the cursor position.

As shown in a character-unit input screen G10-2, when the user inputs a predetermined speech input start operation (e.g., an operation to select the speech input start operation object G14) to the operation input portion 115, the operation detection portion 143 detects the speech input start operation. Then, the mode control portion 144 switches the information input mode from the character-unit input mode to the phrase-unit input mode, and the output control portion 147 causes a phrase-unit input screen G10-3 to be displayed. It is possible to input information by speech in the phrase-unit input mode, and so the user starts speaking an utterance toward the sound collection portion 120. The sound collection portion 120 obtains sound information by sound collection.

As shown in a sound collecting screen G10-4, when the sound information acquisition portion 142 acquires sound information obtained through sound collection by the sound collection portion 120, the output control portion 147 causes a predetermined object (hereinafter referred to as "display object") Mu to be displayed. The display object Mu may be stationary or may have motion as shown on the screen G10-4. In one example, in a case where the display object Mu has motion, a movement direction De of the display object Mu may be determined depending on the arrival direction from a sound source of the user-uttered speech to the sound collection portion 120. Moreover, a technique of estimating the arrival direction of the user-uttered speech is not limited to a particular technique.

In one example, the recognition control portion 145 may estimate one arrival direction that is identical or similar to the finger direction of the user performing the operation of selecting the speech input start operation object G14 (e.g., the direction from the base to the fingertip of the finger) as the arrival direction of the user-uttered speech. The range of similarity may be predetermined. In addition, the finger direction may be acquired by analyzing the input image acquired by the input image acquisition portion 141. Alternatively, the finger direction may be acquired by analyzing the finger's shape detected by the operation detection portion 143.

Alternatively, the recognition control portion 145 may estimate the arrival direction of the sound input by the sound collection portion 120 as the arrival direction of the user-uttered speech. In a case where there are a plurality of sound arrival directions, the arrival direction of the sound that is initially input among the plurality of arrival directions may be estimated as the arrival direction of the user-uttered speech. Alternatively, one arrival direction that is identical or similar to the finger direction of the user performing the operation of selecting the speech input start operation object G14 may be estimated as the arrival direction of the user-uttered speech.

Alternatively, the recognition control portion 145 may estimate the arrival direction of the sound that is input with the largest sound volume by the sound collection portion 120 among the plurality of arrival directions as the arrival direction of the user-uttered speech. In this way, the arrival direction of the user-uttered speech can be estimated. On the other hand, the recognition control portion 145 may acquire the sound that is input by the sound collection portion 120 from the direction other than the arrival direction of the user-uttered speech as noise.

Further, FIG. 3 illustrates an example in which the output control portion 147 moves the display object Mu in the arrival direction (the movement direction De) of the user-uttered speech. This makes it possible for the user to intuitively know that the speech uttered by the user itself is collected by the sound collection portion 120. However, the motion of the display object Mu is not limited to such motion. In addition, FIG. 3 illustrates an example in which the destination of the display object Mu is the speech input start operation object G14. However, the destination of the display object Mu is not limited to this example.

Further, FIG. 3 illustrates an example in which the output control portion 147 moves the circular display object Mu appearing one after another depending on the sound collection by the sound collection portion 120, but the display form of the display object Mu is not limited to this example. In one example, the output control portion 147 may control various parameters of the display object Mu on the basis of predetermined information (e.g., speech likeness and sound volume of sound information) corresponding to the sound information. The sound information used in this case may be the sound information from the arrival direction of the user-uttered speech. In addition, the parameter of the display object Mu may include at least one of the shape, transparency, color, size, and motion of the display object Mu.

The recognition control portion 145 causes the speech recognition portion 146 to start the speech recognition processing on the sound information acquired by the sound information acquisition portion 142. The timing to start the speech recognition processing on the sound information is not limited to particular timing. In one example, the recognition control portion 145 may cause the speech recognition portion 146 to start the speech recognition processing on the sound information corresponding to the display object Mu after the display object Mu reaches the speech input start operation object G14. In addition, the speech recognition processing may be completed at the timing as described above.

Figure 4:
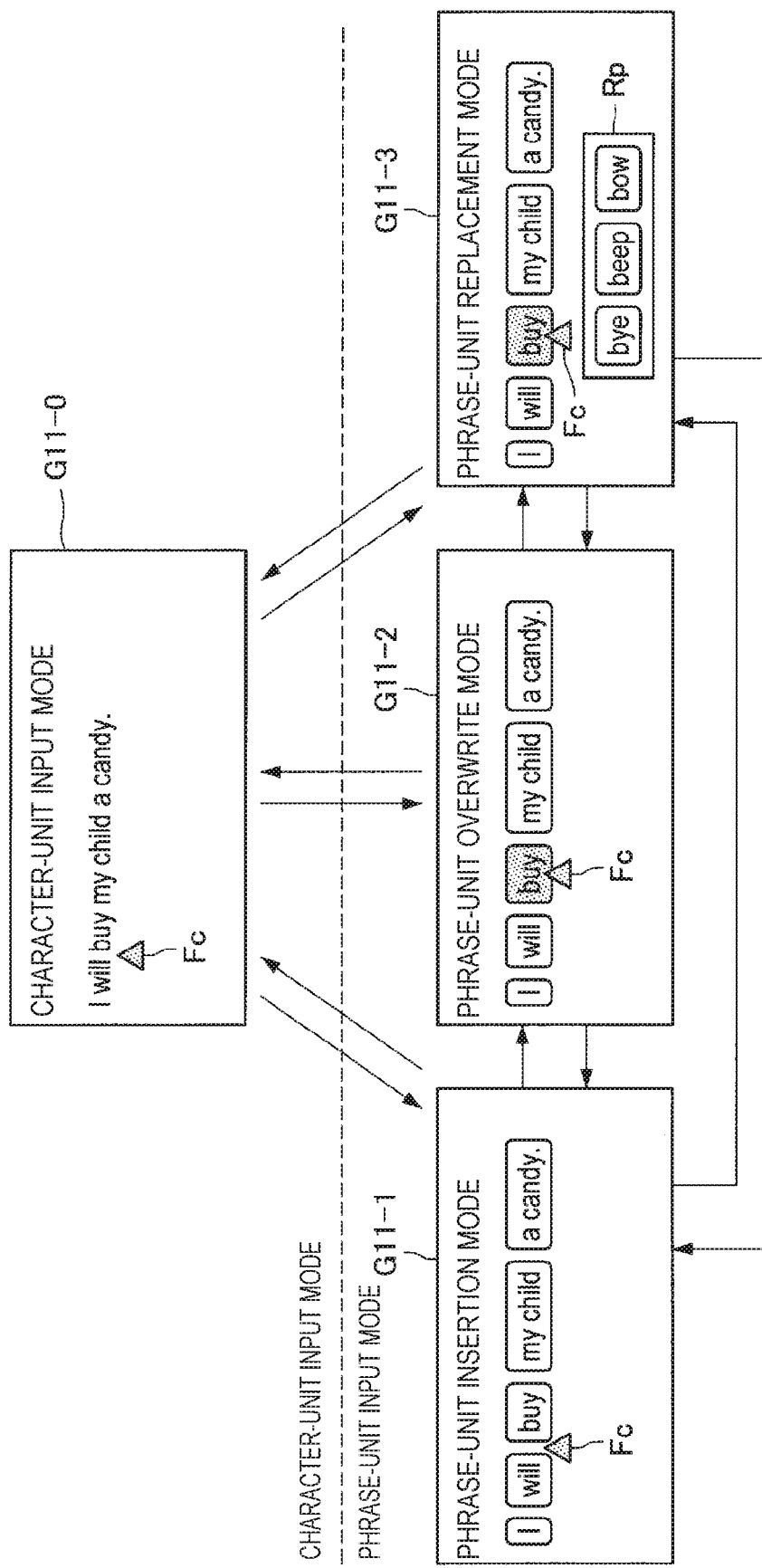
FIG. 4 is a diagram illustrated to describe an example of information input mode switching between a phrase-unit insertion mode, a phrase-unit overwrite mode, and a phrase-unit replacement mode.

Various modes can be envisaged as the phrase-unit input mode. In one example, the phrase-unit input mode may include at least one of a phrase-unit insertion mode, a phrase-unit overwrite mode, and a phrase-unit replacement mode. The case where the phrase-unit insertion mode, the phrase-unit overwrite mode, and the phrase-unit replacement mode exist as the phrase-unit input mode is mainly described below. FIG. 4 is a diagram illustrated to describe an example of information input mode switching between the phrase-unit insertion mode, the phrase-unit overwrite mode, and the phrase-unit replacement mode.

Referring to FIG. 4, a display field G11-0 in the "character-unit input mode" is shown as an example of the display field G11 that is a display field of input information. In the display field G11-0, the input information is displayed in units of characters. In addition, as an example of the "phrase-unit input mode", a display field G11-1 in the "phrase-unit insertion mode", a display field G11-2 in the "phrase-unit overwrite mode" and a display field G11-3 in the "phrase-unit replacement mode" are shown. In the display fields G11-1 to G11-3, the input information is displayed in units of phrases.

Here, in the "character-unit input mode", the output control portion 147 inserts the information detected by the operation detection portion 143 into the position of a cursor Fc in units of characters. On the other hand, the "phrase-unit insertion mode" may be a mode in which the result of the speech recognition processing is inserted into an inter-phrase position where the cursor Fc is placed. The "phrase-unit overwrite mode" may be a mode in which the phrase at the position where the cursor Fc is placed is overwritten with the result of the speech recognition processing. In addition, the "phrase-unit replacement mode" may be a mode in which the phrase at the position where the cursor Fc is placed is replaced with a replacement candidate Rp. The replacement with the replacement candidate Rp may be performed by using a selection operation of the replacement candidate Rp as a trigger. In addition, as illustrated in FIG. 4, the phrase to which the cursor Fc points may be highlighted.

Figure 5:
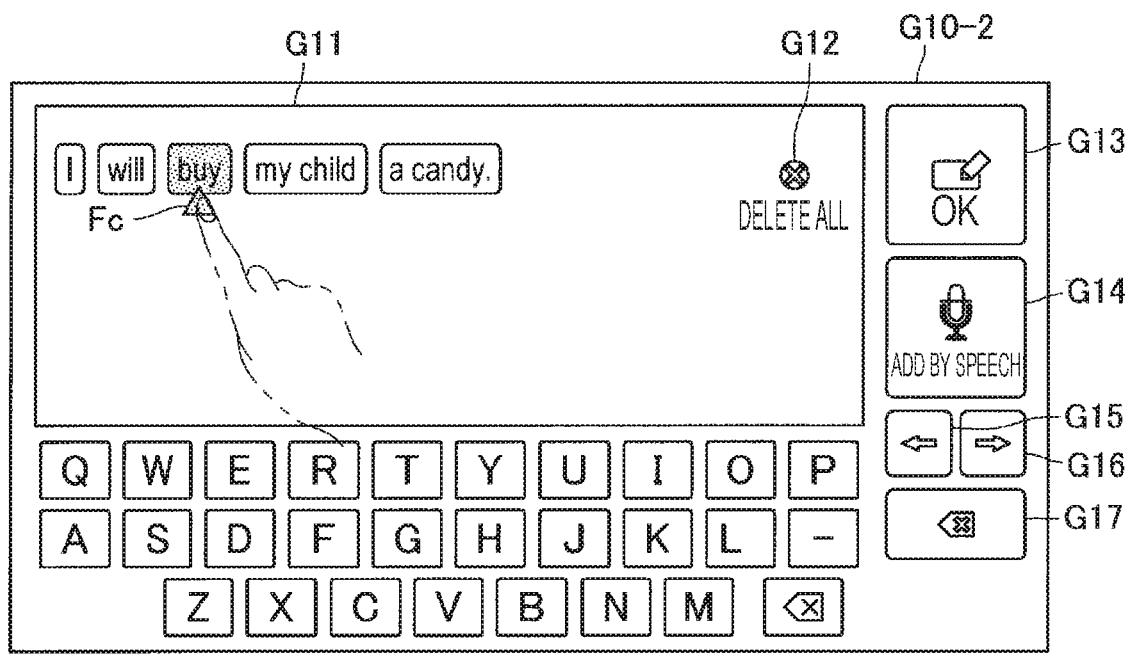
FIG. 5 is a diagram illustrated to describe an example of a technique of moving a position of a cursor.
Figure 6:
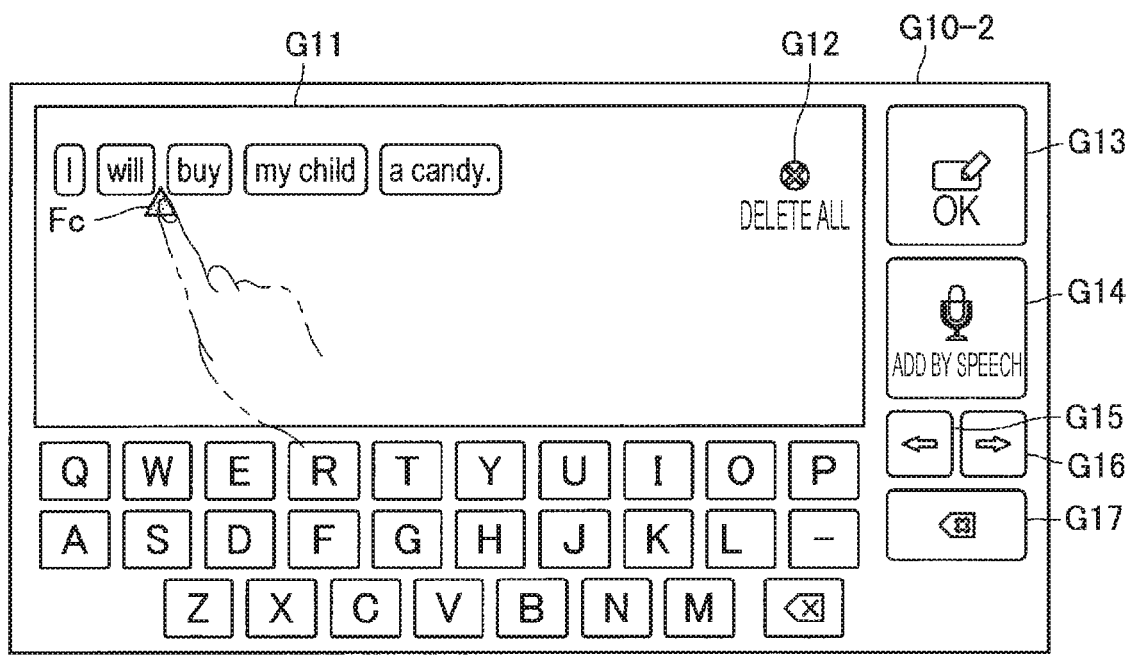
FIG. 6 is a diagram illustrated to describe an example of a technique of moving a position of a cursor.

It is possible to move the position of the cursor Fc by various operations. FIGS. 5 to 8 are diagrams illustrated to describe an example of a technique of moving the position of the cursor Fc. As illustrated in FIG. 5, in a case where an operation of selecting a phrase itself (e.g., an operation of tapping the phrase itself) is detected, the output control portion 147 may cause the cursor Fc to be moved on the phrase. In addition, as illustrated in FIG. 6, in a case where an operation of selecting an inter-phrase position (e.g., an operation of tapping the inter-phrase position) is detected, the output control portion 147 may cause the cursor Fc to be moved to the inter-phrase position.

Figure 7:
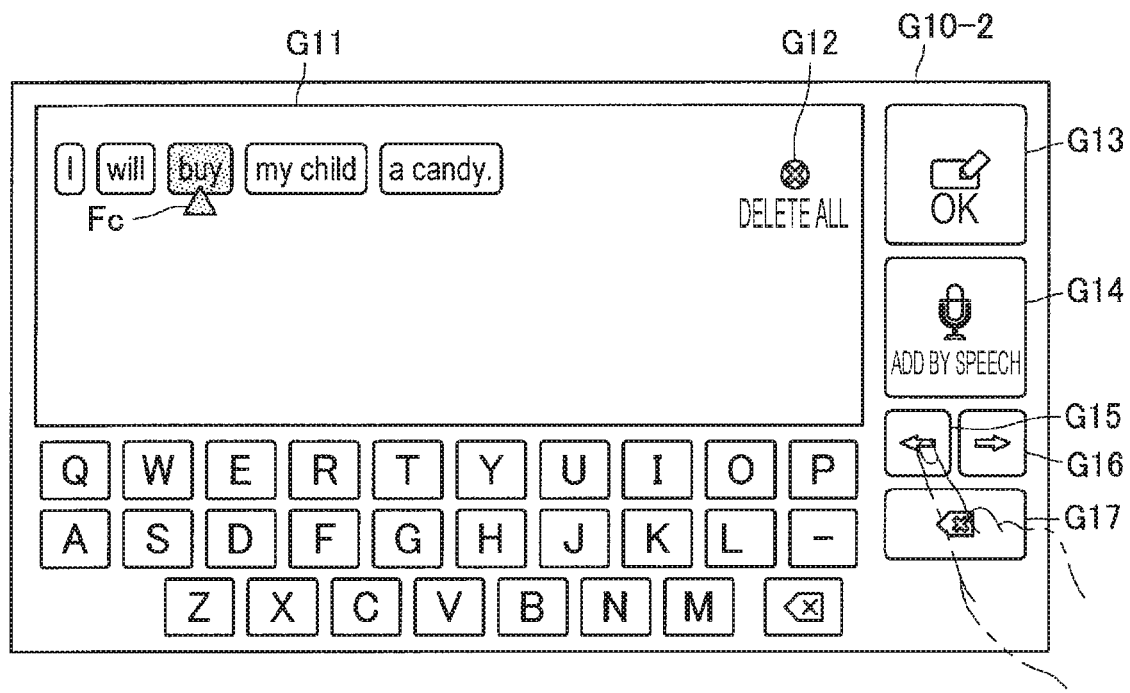
FIG. 7 is a diagram illustrated to describe an example of a technique of moving a position of a cursor.

As illustrated in FIG. 7, in a case where the operation of selecting the backward movement operation object G15 (e.g., the operation of tapping the backward movement operation object G15) is detected, the output control portion 147 may move the cursor Fc backward. The backward movement may be movement to an adjacent backward position. In one example, the cursor Fc may alternately move the position on the phrase and the inter-phrase position backward, move only the position on the phrase backward, or move only the inter-phrase position backward. These backward movement techniques may vary depending on the coexistence among a plurality of modes as will be described later.

Figure 8:
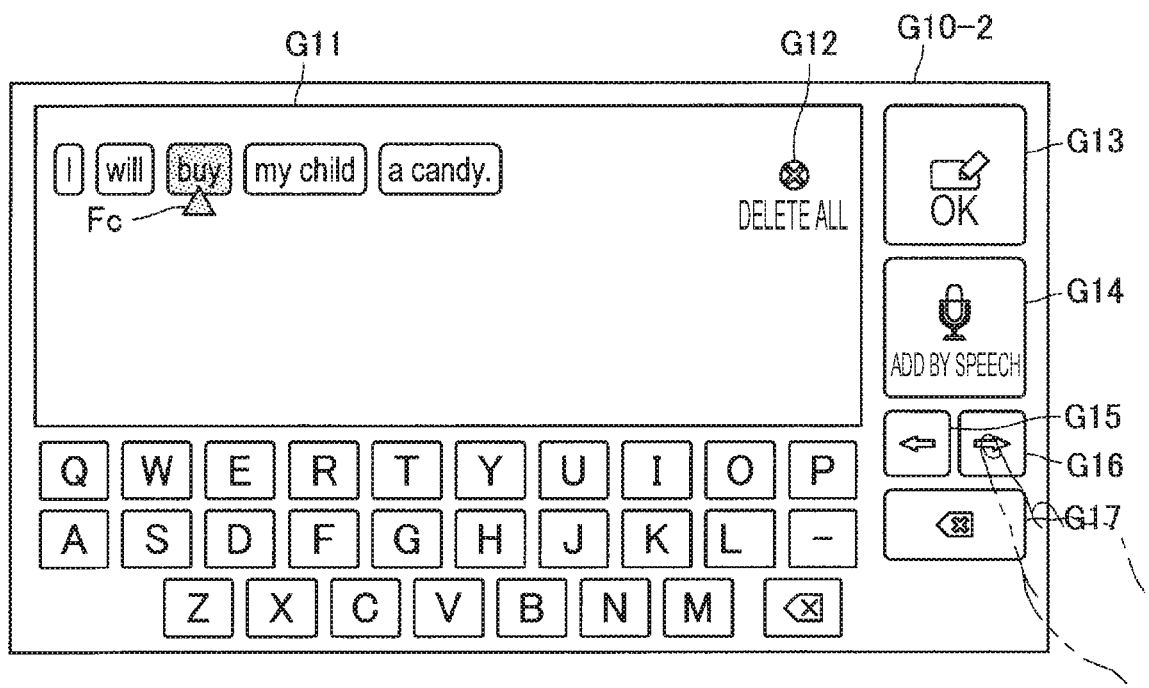
FIG. 8 is a diagram illustrated to describe an example of a technique of moving a position of a cursor.

Further, as illustrated in FIG. 8, in a case where the operation of selecting the forward movement operation object G16 (e.g., the operation of tapping the forward movement operation object G16) is detected, the output control portion 147 may move the cursor Fc forward. The destination to forward movement may be movement to an adjacent forward position. In one example, the cursor Fc may alternately move the position on the phrase and the inter-phrase position forward, move only the position on the phrase forward, or move only the inter-phrase position forward. These forward movement techniques may vary depending on the coexistence among a plurality of modes as will be described later.

In the examples illustrated in FIGS. 5 to 8, the example of moving the cursor Fc in units of phrases has been described. However, it is also possible to move the cursor Fc in units of characters. In one example, in a case where an operation of selecting an intermediate position between characters (e.g., an operation of tapping an intermediate position between characters) is detected, the output control portion 147 may cause the cursor Fc to be moved to the selected position. In addition, in the case where the operation of selecting the backward movement operation object G15 is detected, the output control portion 147 may cause the cursor Fc to be moved backward in units of characters. In the case where the operation of selecting the forward movement operation object G16 is detected, the output control portion 147 may cause the cursor Fc to be moved forward in units of characters.

An example of the information input mode switching may include various examples. In one example, in the case where the "character-unit input mode" is executed as the information input mode, if the operation detection portion 143 detects the speech input start operation, the mode control portion 144 may switch the information input mode from the "character-unit input mode" to the "phrase-unit insertion mode". On the other hand, in the case where the "phrase-unit insertion mode" is executed as the information input mode, if the speech recognition processing is completed, the mode control portion 144 may switch the information input mode from the "phrase-unit insertion mode" to the "character-unit input mode".

Further, in the case where the "phrase-unit overwrite mode" is executed as the information input mode, if the speech recognition processing is completed, the mode control portion 144 may switch the information input mode from the "phrase-unit overwrite mode" to the "character-unit input mode". In addition, in the case where the "phrase-unit replacement mode" is executed as the information input mode, if the speech recognition processing is completed, the mode control portion 144 may switch the information input mode from the "phrase-unit replacement mode" to the "character-unit input mode".

Further, in the case where the "phrase-unit insertion mode" is executed as the information input mode, if the speech recognition portion 146 acquires the result of the speech recognition processing, the mode control portion 144 may switch the information input mode from the "phrase-unit insertion mode" to the "phrase-unit replacement mode". Similarly, in the case where the "phrase-unit overwrite mode" is executed as the information input mode, if the speech recognition portion 146 acquires the result of the speech recognition processing, the mode control portion 144 may switch the information input mode from the "phrase-unit overwrite mode" to the "phrase-unit replacement mode".

Further, in the case where the "phrase-unit replacement mode" is executed as the information input mode, if a predetermined overwrite start trigger is detected, the mode control portion 144 may switch the information input mode from the "phrase-unit replacement mode" to the "phrase-unit overwrite mode". The overwrite start trigger may be a trigger that does not overlap with the speech input end trigger among triggers listed as an example of the speech input end trigger.

In the case where the "phrase-unit replacement mode" is executed as the information input mode, if a predetermined insertion start trigger is detected, the mode control portion 144 may switch the information input mode from the "phrase-unit replacement mode" to the "phrase-unit Insertion mode". The insertion start trigger may be a trigger that does not overlap with the overwrite start trigger among triggers listed as an example of the overwrite start trigger.

Alternatively, there may be a case where the cursor Fc can be moved to both the position on the phrase and the inter-phrase position in the "phrase-unit replacement mode". In this case, the mode control portion 144 may determine to switch the information input mode into any one of the "phrase-unit overwrite mode" and the "phrase-unit insertion mode" depending on whether the cursor Fc is moved to the position on the phrase or moved to the inter-phrase position. In this event, the overwrite start trigger and the insertion start trigger are not necessarily provided separately, and they may be used in common.

Figure 9:
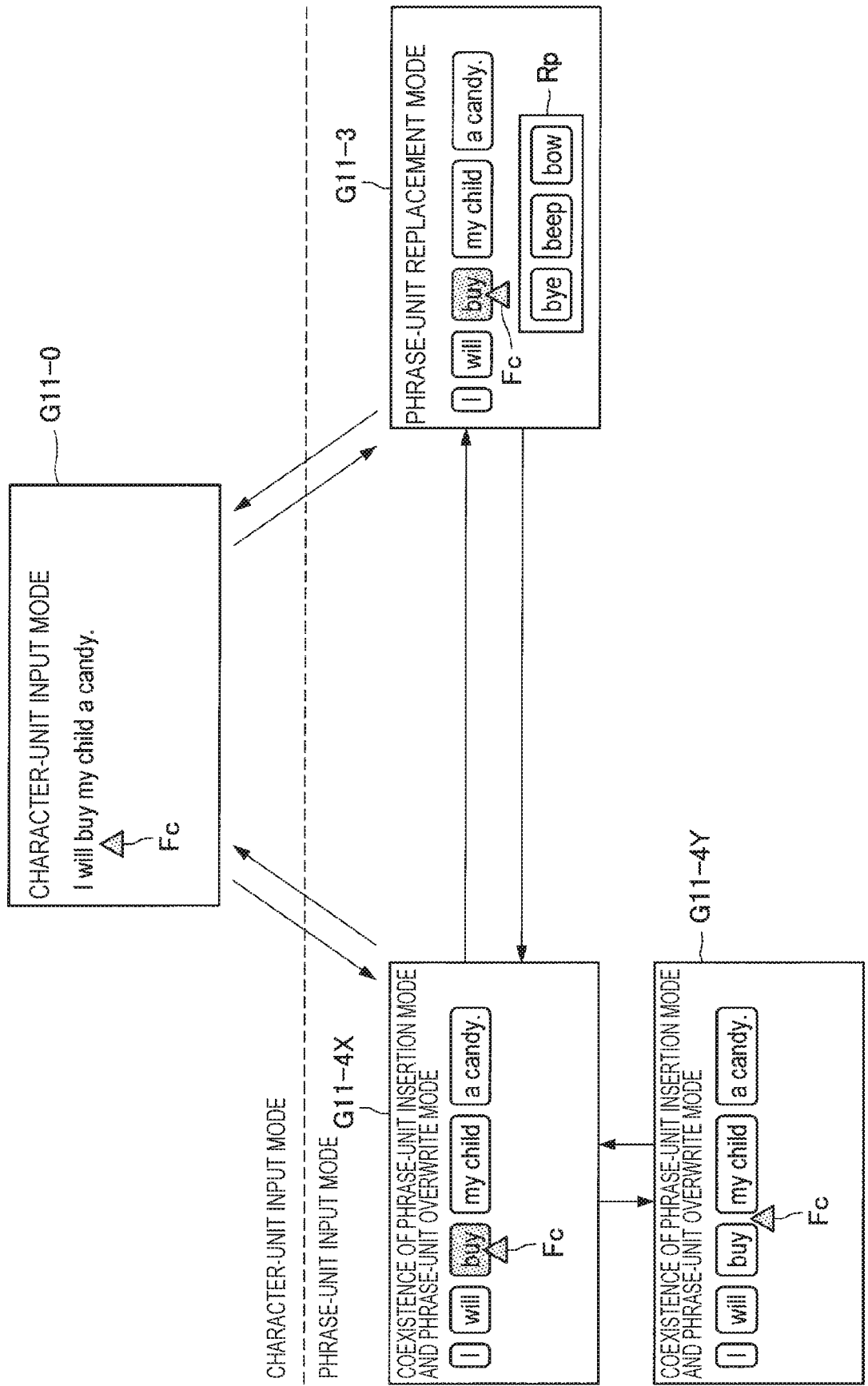
FIG. 9 is a diagram illustrated to describe a case where a phrase-unit insertion mode and a phrase-unit overwrite mode coexist.

In the above, the case where the "character-unit input mode", the "phrase-unit insertion mode", the "phrase-unit overwrite mode", and the "phrase-unit replacement mode" exist independently has been described. However, some of these modes may coexist. A case where some of them coexist is described below. A case where the phrase-unit insertion mode and the phrase-unit overwrite mode coexist is described now. FIG. 9 is a diagram illustrated to describe the case where the phrase-unit insertion mode and the phrase-unit overwrite mode coexist.

A display field G11-4X is a display field of input information in a case where the cursor Fc is placed on the phrase. In addition, a display field G11-4Y is a display field of input information in a case where the cursor Fc is placed at the inter-phrase position. In the case where the phrase-unit insertion mode and the phrase-unit overwrite mode are executed (in the display field G11-4Y and the display field G11-4X, respectively), it is possible for the output control portion 147 to cause the cursor Fc to be moved alternately between the position on the phrase and the inter-phrase position.

Then, in the case where the cursor Fc is moved from the inter-phrase position to the position on the phrase, the mode control portion 144 switches the information input mode from the phrase-unit insertion mode (the display field G11-4Y) to the phrase-unit overwrite mode (the display field G11-4X). On the other hand, in the case where the cursor Fc is moved from the position on the phrase to the inter-phrase position, the mode control portion 144 switches the information input mode from the phrase-unit overwrite mode (the display field G11-4X) to the phrase-unit insertion mode (display field G11-4Y). The switching timing between the other modes is the same as the case described above.

As described above, in the case where the phrase-unit insertion mode and the phrase-unit overwrite mode coexist, it is possible to perform the insertion in units of phrases and the overwriting in units of phrases using simple mode switching. Thus, in the case where the phrase-unit insertion mode and the phrase-unit overwrite mode coexist, the degree of freedom of speech input can be improved.

Figure 10:
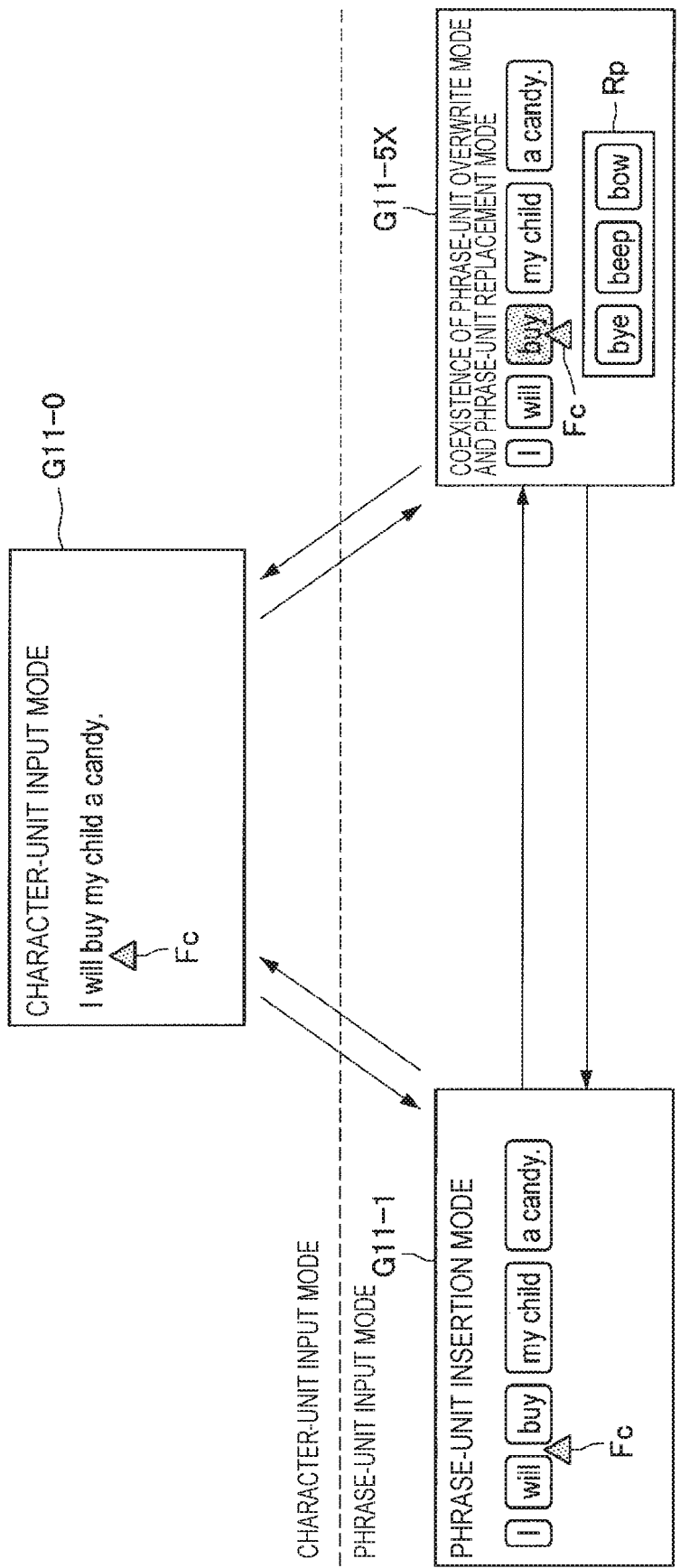
FIG. 10 is a diagram illustrated to describe a case where the phrase-unit overwrite mode and a phrase-unit replacement mode coexist.

Subsequently, a case where the phrase-unit overwrite mode and the phrase-unit replacement mode coexist is described. FIG. 10 is a diagram illustrated to describe a case where the phrase-unit overwrite mode and the phrase-unit replacement mode coexist. A display field G11-5X is a display field of input information in the case where the phrase-unit overwrite mode and the phrase-unit replacement mode coexist. In the phrase-unit overwrite mode and the phrase-unit replacement mode (in the display field G11-5X), there may be a case where the sound information is acquired from the sound collection portion 120 in the state where the cursor Fc is placed on the phrase. In this case, the mode control portion 144 overwrites the phrase at the position of the cursor Fc depending on the result of the speech recognition processing on the sound information.

On the other hand, in the phrase-unit overwrite mode and the phrase-unit replacement mode (in the display field G11-5X), there may be a case where the operation detection portion 143 detects an operation of selecting the replacement candidate Rp in the state where the cursor Fc is placed on the phrase. In this case, the mode control portion 144 replaces the selected replacement candidate Rp with the phrase at the position of the cursor Fc. The switching timing between other modes is the same as the case described above.

As described above, in the case where the phrase-unit overwrite mode and the phrase-unit replacement mode coexist, even when a candidate desired by the user fails to be found among the replacement candidates Rp, it is possible to overwrite a phrase by speech by performing simple switching between the information input modes. Thus, when the phrase-unit overwrite mode and the phrase-unit replacement mode coexist, it is possible to reduce time and effort of switching between the information input modes.

Figure 11:
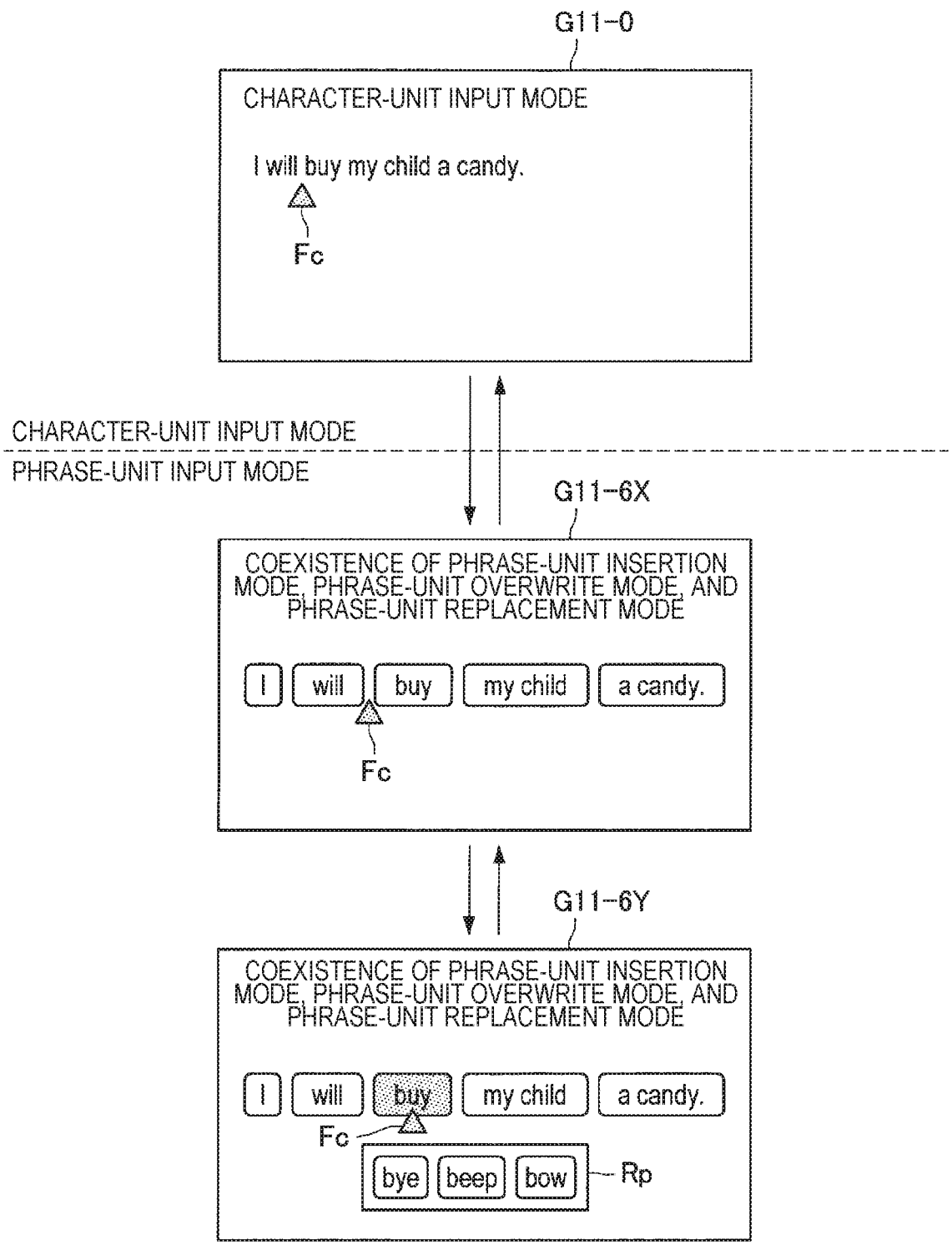
FIG. 11 is a diagram illustrated to describe a case where the phrase-unit insertion mode, the phrase-unit overwrite mode, and the phrase-unit replacement mode coexist.

Subsequently, a case where the phrase-unit insertion mode, the phrase-unit overwrite mode, and the phrase-unit replacement mode coexist is described. FIG. 11 is a diagram illustrated to describe a case where the phrase-unit insertion mode, the phrase-unit overwrite mode, and the phrase-unit replacement mode coexist. A display field G11-6X is a display field of input information when the cursor Fc is placed at the inter-phrase position. A display field G11-6Y is a display field of input information when the cursor Fc is placed on the phrase. It is possible for the output control portion 147 to cause the cursor Fc to be moved alternately between the position on the phrase and the inter-phrase position.

Then, in the case where the cursor Fc is moved from the inter-phrase position to the position on the phrase, the mode control portion 144 switches the information input mode from the phrase-unit insertion mode (the display field G11-

6X) to the phrase-unit overwrite mode and the phrase-unit replacement mode (the display field G11-6Y). On the other hand, in the case where the cursor Fc is moved from the position on the phrase to the inter-phrase position, the mode control portion 144 switches the information input mode from the phrase-unit overwrite mode and the phrase-unit replacement mode (the display field G11-6Y) to the phrase-unit insertion mode (the display field G11-6X).

In the phrase-unit overwrite mode and the phrase-unit replacement mode (in the display field G11-6Y), there may be a case where the sound information is acquired from the sound collection portion 120 in the state where the cursor Fc is placed on the phrase. In this case, the mode control portion 144 overwrites the phrase at the position of the cursor Fc depending on the result of the speech recognition processing on the sound information.

On the other hand, in the phrase-unit overwrite mode and the phrase-unit replacement mode (in the display field G11-6Y), there may be a case where the operation detection portion 143 detects an operation of selecting the replacement candidate Rp in the state where the cursor Fc is placed on the phrase. In this case, the mode control portion 144 replaces the selected replacement candidate Rp with the phrase at the position of the cursor Fc. The switching timing between other modes is the same as the case described above.

As described above, in the case where the phrase-unit insertion mode, the phrase-unit overwrite mode, and the phrase-unit replacement mode coexist, it is possible to insert, overwrite, and replace the phrase by performing simple switching between the information input modes. Thus, in the case where the phrase-unit insertion mode, the phrase-unit overwrite mode, and the phrase-unit replacement mode coexist, it is possible to further reduce time and effort of switching between the information input modes.

Figure 12:
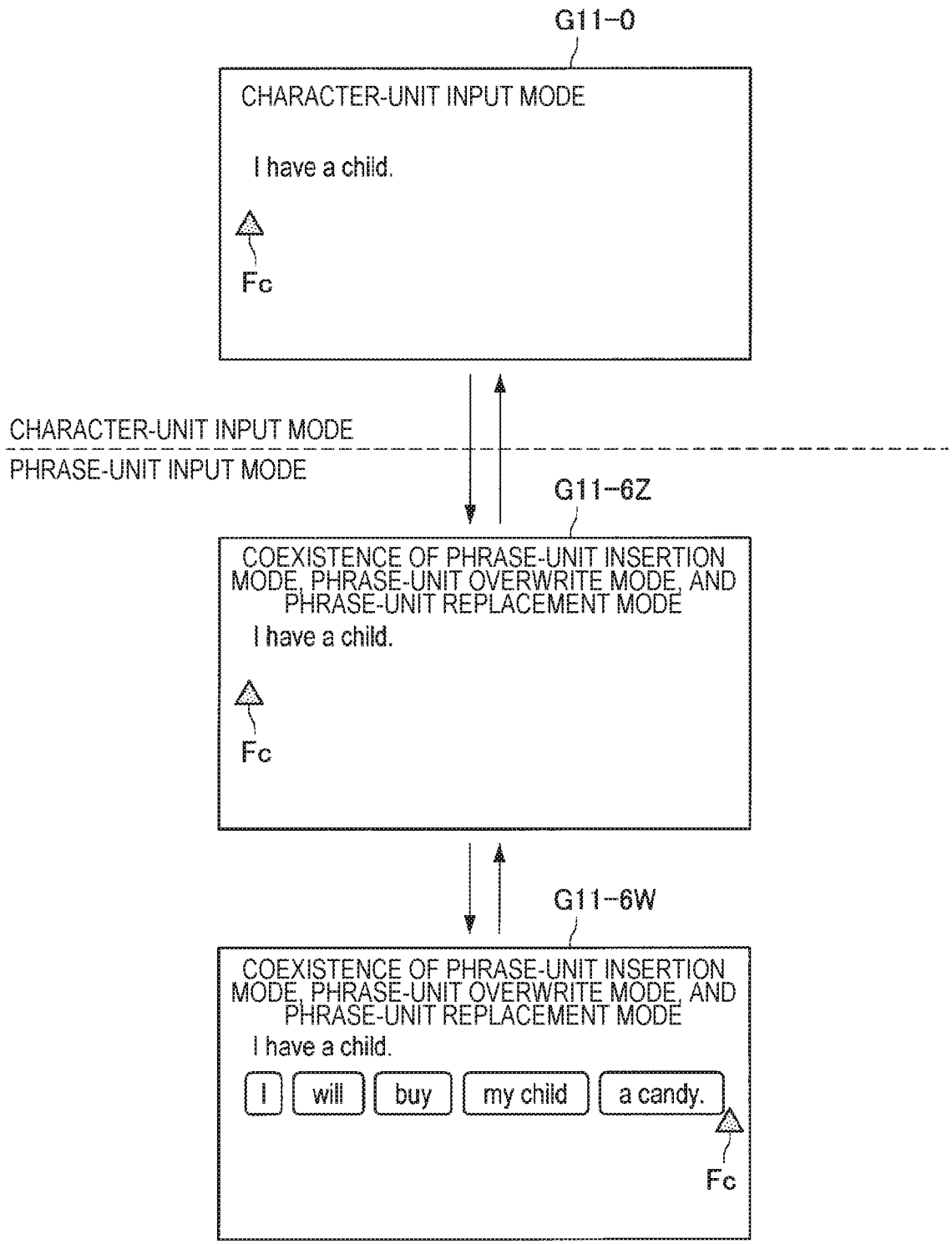
FIG. 12 is a diagram illustrated to describe a case where information that is input in the character-unit input mode is prevented from being converted into a phrase.

In the above example, regardless of whether the information input mode is the phrase-unit input mode, it is assumed that the input information is converted into a phrase, but the information that is input in the character-unit input mode may be prevented from being converted into a phrase. FIG. 12 is a diagram illustrated to describe a case where the information that is input in the character-unit input mode is prevented from being converted into a phrase. A display field G11-6Z is a display field of input information when the switching from the character-unit input mode to the phrase-unit insertion mode is performed.

In the display field G11-6Z, the information that is input in the character-unit input mode is displayed, but it is prevented from being converted into a phrase. On the other hand, as shown in a display field G11-6W, when a new result of the speech recognition processing is inserted as the input information, the output control portion 147 converts the input information that is newly input into a phrase. Although FIG. 12 illustrates an example in which the phrase-unit insertion mode, the phrase-unit overwrite mode, and the phrase-unit replacement mode coexist, the relationship between the phrase-unit insertion mode, the phrase-unit overwrite mode, and the phrase-unit replacement mode is not limited to particular relationship. Thus, it may be, in one example, any of the relationship described with reference to FIGS. 9 to 11.

As described above, it is possible to convert the information that is input in the phrase-unit input mode into a phrase and to prevent the information that is input in the character-unit input mode from being converted into a phrase. This makes it possible for the user to know easily how the information (the result of the speech recognition processing) that is input in the phrase-unit input mode is converted into a phrase.

The example in which the cursor Fc is moved by a button operation in the phrase-unit input mode has been described above. However, it is also possible to move the cursor Fc by speech. In one example, in the case where identification information corresponding to the inter-phrase position or the phrase is arranged and the identification is recognized as the result of the speech recognition processing, the output control portion 147 may cause the cursor Fc to be moved to the inter-phrase position or the phrase corresponding to the identification information. This makes it possible to move easily the cursor Fc.

Figure 13:
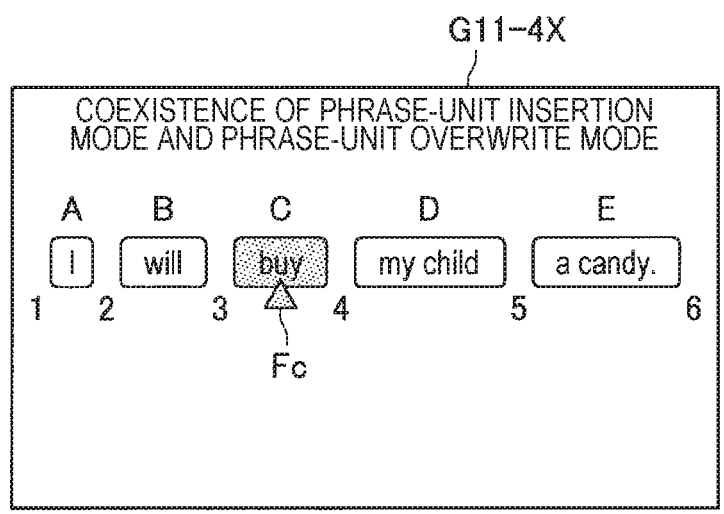
FIG. 13 is a diagram illustrated to describe an example of moving a cursor by speech.

A specific example is described now. FIGS. 13 to 16 are diagrams illustrated to describe an example of moving the cursor Fc by speech. Referring to FIG. 13, the output control portion 147 may arrange "1" to "6" as the identification information corresponding to the inter-phrase position and may arrange "A" to "E" as the identification information corresponding to the phrase. In this way, the output control portion 147 may arrange identification information corresponding to all the inter-phrase position and the phrase.

Figure 14:
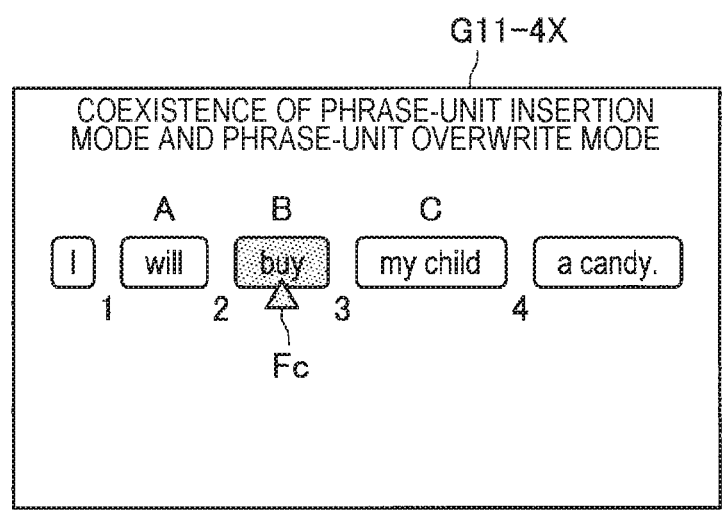
FIG. 14 is a diagram illustrated to describe an example of moving a cursor by speech.

Referring to FIG. 14, the output control portion 147 arranges "1" to "4" as the identification information corresponding to the inter-phrase position within a range from between one phase before and two phrases before from the current position of the cursor Fc to between one phase after and two phrases after from the current position of the cursor Fc. The output control portion 147 arranges "A" to "C" as the identification information corresponding to the phrase within the range. In this way, the output control portion 147 may arrange the identification information corresponding to the inter-phrase position and the phrase within a predetermined range by setting the current position of the cursor Fc as a reference.

Figure 15:
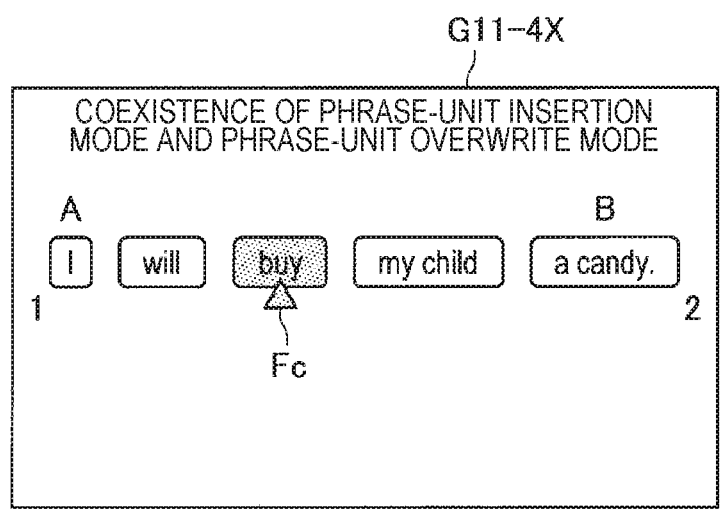
FIG. 15 is a diagram illustrated to describe an example of moving a cursor by speech.

Referring to FIG. 15, the output control portion 147 may arrange "1" and "2" as the identification information respectively corresponding to the inter-phrase position and the phrase preceding two phases before and may arrange "A" and "B" as the identification information respectively corresponding to the inter-phrase position and the phrase succeeding two phases after. In this way, the output control portion 147 may arrange the identification information corresponding to the inter-phrase position and the phrase outside the predetermined range by setting the current position of the cursor Fc as a reference.

Figure 16:
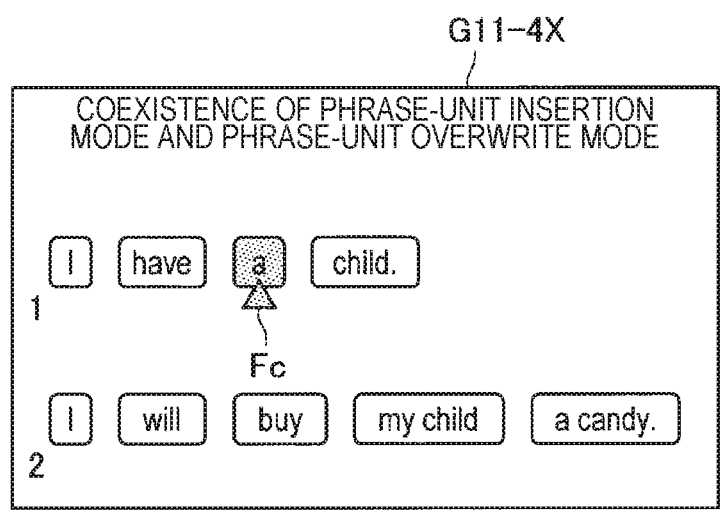
FIG. 16 is a diagram illustrated to describe an example of moving a cursor by speech.

Further, referring to FIG. 16, the output control portion 147 arranges "1" and "2" as the identification information corresponding to the position of the punctuation mark. In this way, the output control portion 147 may arrange the identification information corresponding to the delimiter between sentences (e.g., the position of the punctuation mark). In this way, if the identification information is arranged at the delimiter between sentences, it is possible for the user to move the cursor Fc to any sentence head position by speech input and to perform information input in units of phrases from the sentence head position.

Figure 17:
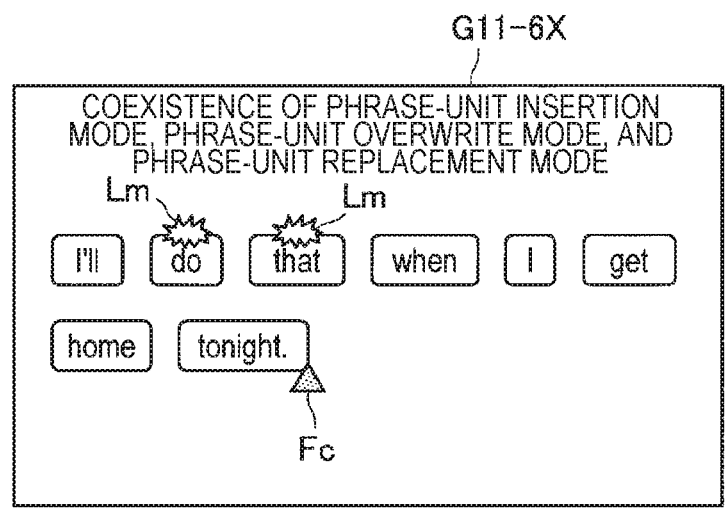
FIG. 17 is a diagram illustrating an example of presenting a part to be improved before translation to a user.

In the above, the information input in the character-unit input mode and the phrase-unit input mode has been described. Here, the input information may be translated into another language. In this case, in order to achieve normal translation, if there is a part of the input information to be improved before translation among the input information, it is preferable to present the part to the user to allow the user to modify it. FIG. 17 is a diagram illustrating an example of presenting a part to be improved before translation to the user.

As illustrated in FIG. 17, "do" among input information items displayed in the display field G11-6X is preferably changed to a more specific verb. In addition, "that" is preferably changed to a more specific name. Thus, as illustrated in FIG. 17, the output control portion 147 may append a predetermined display object Lm to "do" and "that". This makes it possible for the user to change the part to which the display object Lm is appended before translation.

Further, although FIG. 17 illustrates an example of appending the same display object Lm to "do" and "that", different display objects may be appended to "do" and "that". In one example, the display object appended to "do" may be "specific expression of verb" or the like, and the display object appended to "that" may be a character string such as "specific expression of a noun" or the like.

In the above, an example of achieving the improvement before translation by using a specific verb or noun has been described. However, the point that improvement can be achieved before translation is not limited to this example. In one example, the point that improvement can be achieved before translation may be the use of Chinese character as much as possible, the correction of errors between homonyms and errors of Chinese character, the use of an expression before abbreviation without using the abbreviation, shortening the length of one sentence, and the use of proper postpositional particle. Thus, it is possible for the output control portion 147 to present a part that violates the above exemplary contents to the user.

Moreover, FIG. 17 illustrates the case where the phrase-unit insertion mode, the phrase-unit overwrite mode, and the phrase-unit replacement mode coexist as an example. However, in presenting the part to be improved before translation to the user, the relationship between the phrase-unit insertion mode, the phrase-unit overwrite mode, and the phrase-unit replacement mode is not a particular one, and thus, in one example, it may be any of the relationship described with reference to FIGS. 9 to 11.

The function details of the information processing system 10 according to the embodiment of the present disclosure have been described above.

[1.4. Modified Example of System Configuration]

In the above, the example in which the information processing system 10 is a tablet terminal has been described. However, the system configuration of the information processing system 10 is not limited to this example. FIGS. 18 to 21 are diagrams illustrating a modified example of the system configuration of the information processing system 10. As illustrated in FIGS. 18 to 21, the output portion 130 is a television set, the information processing device 140 is a game console, and the operation input portion 115 may be a controller for operating the game console.

Figure 18:
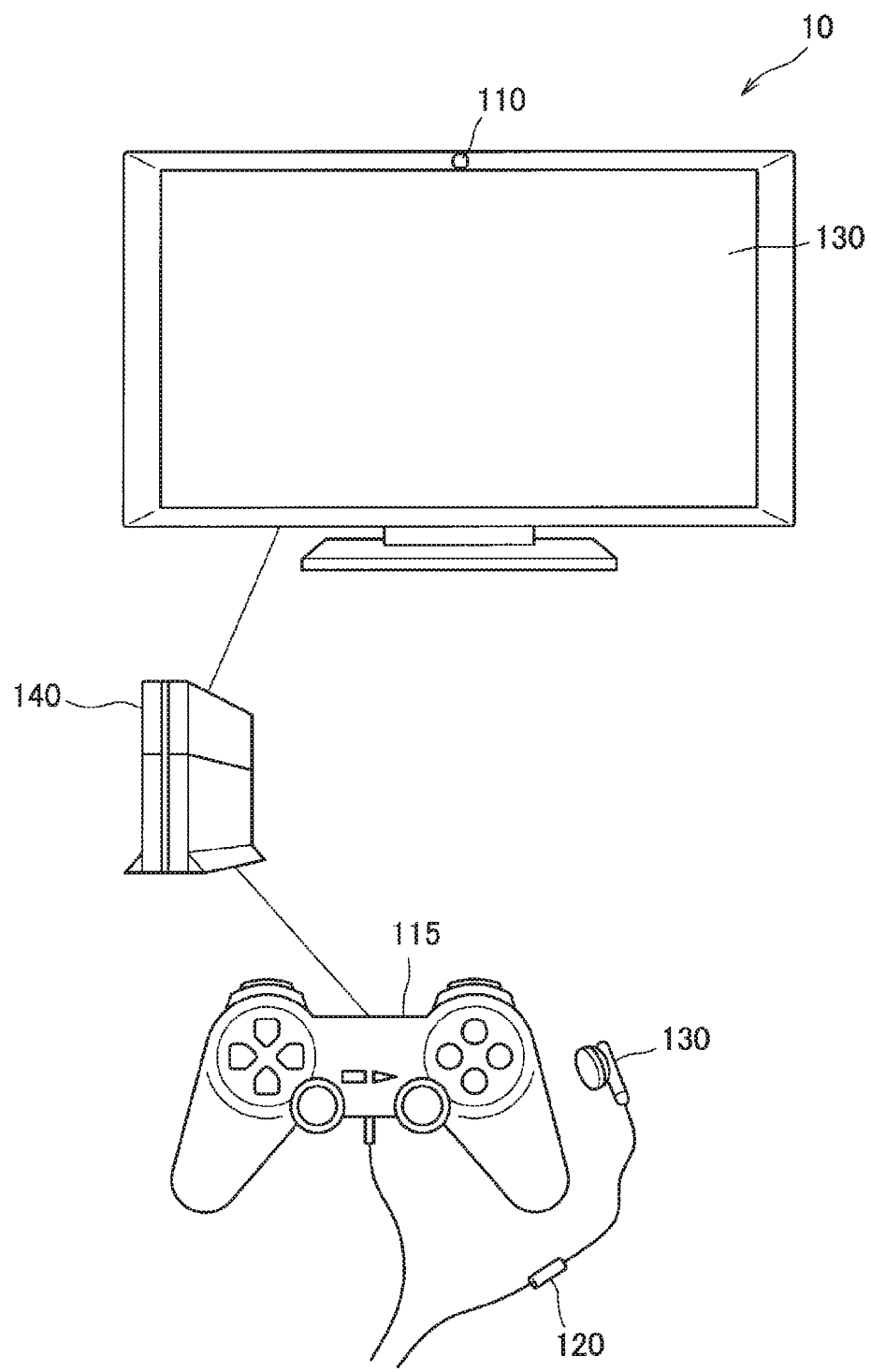
FIG. 18 is a diagram illustrating a modified example of a system configuration of the information processing system.
Figure 19:
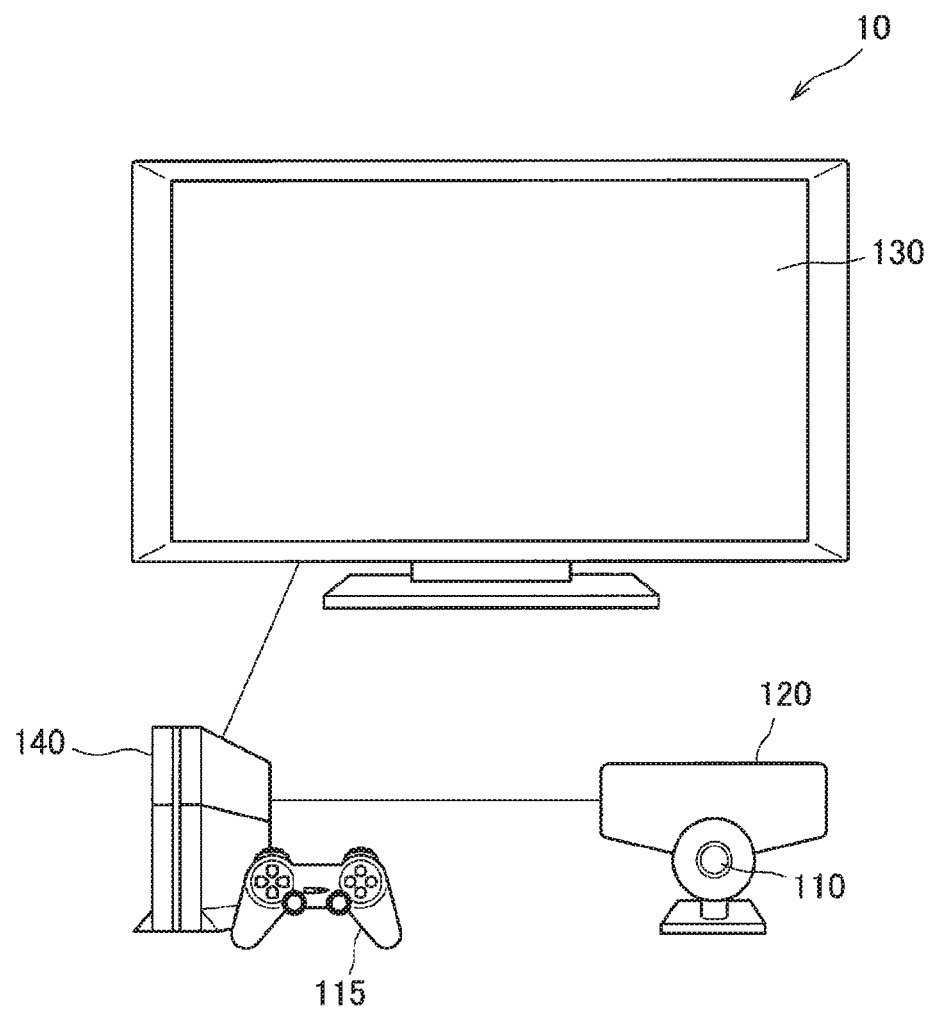
FIG. 19 is a diagram illustrating a modified example of a system configuration of the information processing system.
Figure 20:
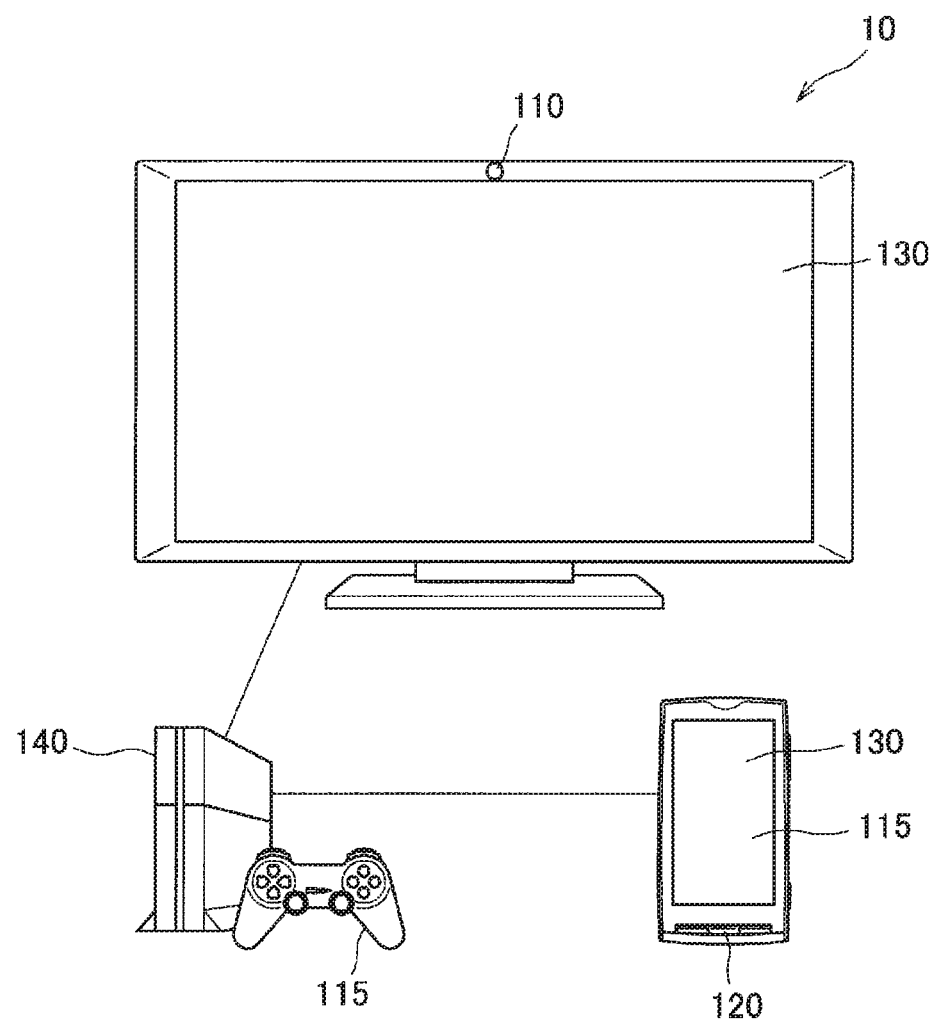
FIG. 20 is a diagram illustrating a modified example of a system configuration of the information processing system.
Figure 21:
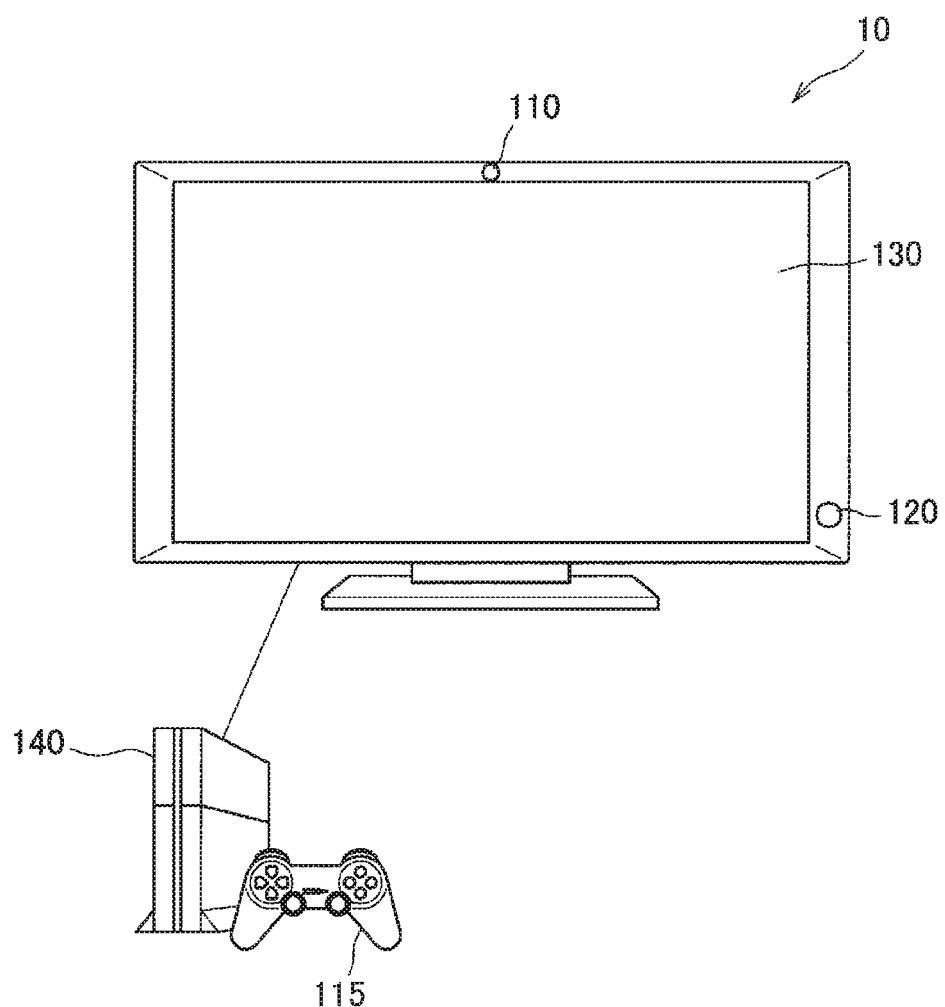
FIG. 21 is a diagram illustrating a modified example of a system configuration of the information processing system.

Further, as illustrated in FIG. 18, the sound collection portion 120 and the output portion 130 may be connected to the operation input portion 115. In addition, as illustrated in FIG. 19, the image input portion 110 and the sound collection portion 120 may be connected to the information processing device 140. In addition, as illustrated in FIG. 20, the operation input portion 115, the sound collection portion 120, and the output portion 130 may be provided in a smartphone connected to the information processing device 140. In addition, as illustrated in FIG. 21, the sound collection portion 120 may be provided in a television set.

[1.5. Hardware Configuration Example]

Figure 22:
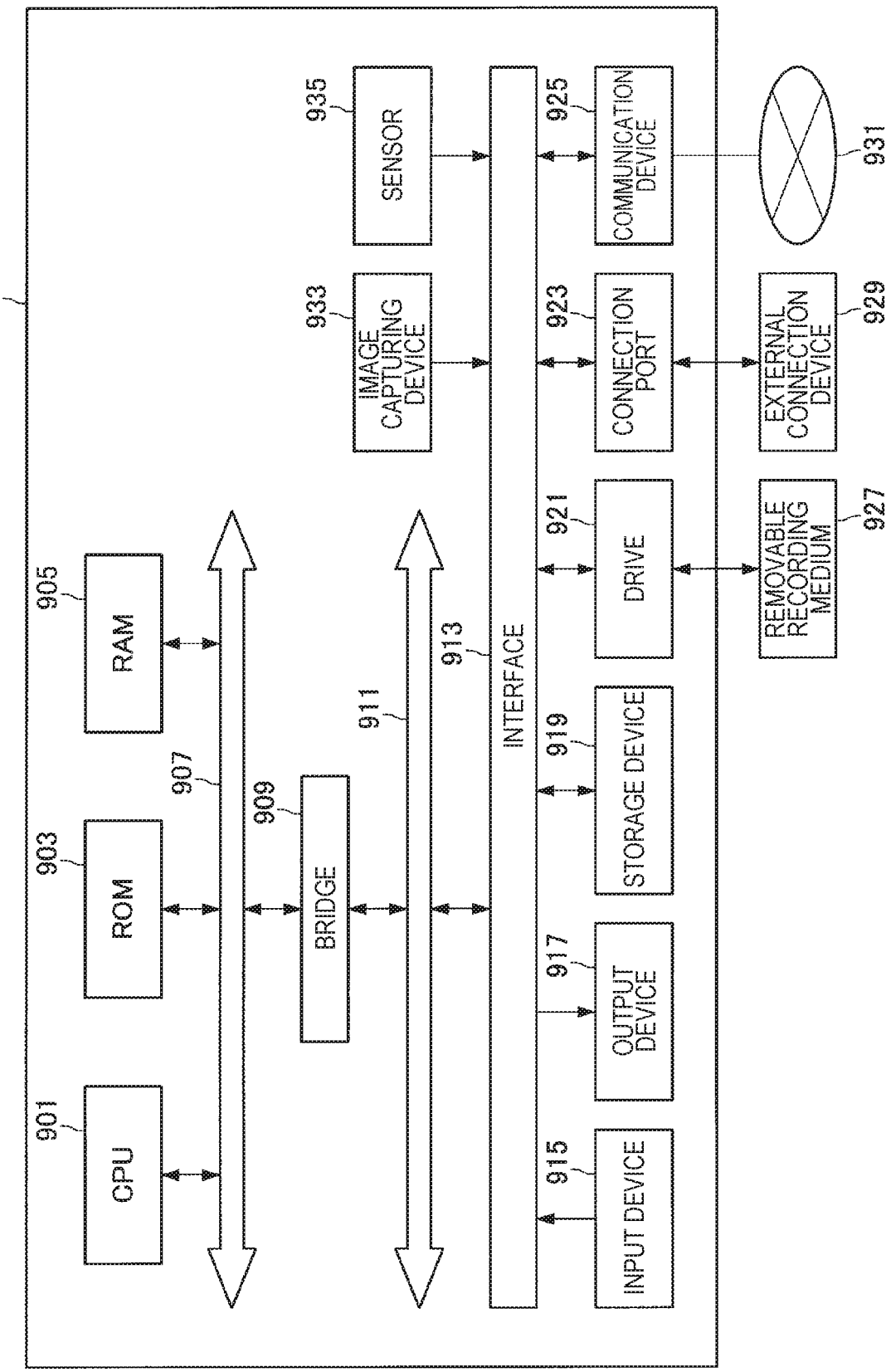
FIG. 22 is a block diagram illustrating a hardware configuration example of the information processing system.

Next, the hardware configuration of the information processing system 10 according to an embodiment of the present disclosure is described with reference to FIG. 22. FIG. 22 is a block diagram illustrating a hardware configuration example of the information processing system 10 according to an embodiment of the present disclosure.

As illustrated in FIG. 22, the information processing system 10 includes a central processing unit (CPU) 901, a read-only memory (ROM) 903, and a random-access memory (RAM) 905. In addition, the information processing system 10 may include a host bus 907, a bridge 909, an external bus 911, an interface 913, an input device 915, an output device 917, a storage device 919, a drive 921, a connection port 923, and a communication device 925. The information processing system 10 may further include an image capturing device 933 and a sensor 935 as necessary. In conjunction with, or in place of, the CPU 901, the information processing system 10 may have a processing circuit called a digital signal processor (DSP) or application specific integrated circuit (ASIC).

The CPU 901 functions as an arithmetic processing unit and a control unit, and controls the overall operation in the information processing system 10 or a part thereof in accordance with various programs recorded in the ROM 903, the RAM 905, the storage device 919, or a removable recording medium 927. The ROM 903 stores, for example, programs and operation parameters used by the CPU 901. The RAM 905 temporarily stores programs used in the execution by the CPU 901 and parameters that vary as appropriate in the execution. The CPU 901, the ROM 903, and the RAM 905 are connected with each other via the host bus 907 that is composed of an internal bus such as a CPU bus. Furthermore, the host bus 907 is connected to the external bus 911 such as peripheral component interconnect/interface (PCI) bus via the bridge 909.

The input device 915 is, for example, a device operated by a user, such as a mouse, a keyboard, a touch panel, a button, a switch, and a lever. The input device 915 may include a microphone for detecting user's speech. The input device 915 may be, for example, a remote control device using infrared rays or other radio waves, or may be an external connection device 929 such as a cellular phone conforming to the operation of the information processing system 10. The input device 915 includes an input control circuit that generates an input signal on the basis of the information input by the user and outputs it to the CPU 901. The user inputs various data to the information processing system 10 and instructs the information processing system 10 to perform a processing operation by operating the input device 915. In addition, the image capturing device 933, which will be described later, can also function as an input device by capturing the motion of the user's hand or finger, and the like. In this case, the pointing position may be determined depending on the motion of the hand or the orientation of the finger.

The output device 917 is composed of a device capable of notifying visually or audibly the user of the acquired information. The output device 917 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917 outputs the result obtained by the processing of the information processing system 10 as a video such as a text or an image, or outputs it as audio such as a speech or sound. In addition, the output device 917 may include, for example, a light for lighting up the surroundings.

The storage device 919 is a data storage device configured as an example of a storage portion of the information processing system 10. The storage device 919 is composed of, for example, a magnetic storage device such as hard disk drive (HDD), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information processing system 10 or externally attached thereto. The drive 921 reads the information recorded on the loaded removable recording medium 927 and outputs it to the RAM 905. In addition, the drive 921 writes in the loaded removable recording medium 927.

The connection port 923 is a port for directly connecting the device to the information processing system 10. The connection port 923 may be, for example, a universal serial bus (USB) port, an IEEE 1394 port, or a small computer system interface (SCSI) port. In addition, the connection port 923 may be, for example, an RS-232C port, an optical audio terminal, or high-definition multimedia interface (HDMI, registered trademark) port. The connection of the external connection device 929 to the connection port 923 makes it possible to exchange various kinds of data between the information processing system 10 and the external connection device 929.

The communication device 925 is, for example, a communication interface composed of a communication device or the like, which is used to be connected to a communication network 931. The communication device 925 may be, for example, a communication card for wired or wireless local area network (LAN), Bluetooth (registered trademark), or wireless USB (WUSB). In addition, the communication device 925 may be, for example, a router for optical communication, a router for asymmetric digital subscriber line (ADSL), or a modem for various communications. The communication device 925 transmits and receives signals or the like using a predetermined protocol such as TCP/IP, for example, with the Internet or other communication devices. In addition, the communication network 931 connected to the communication device 925 is a network connected by wire or wireless, and is, for example, the Internet, home LAN, infrared communication, radio wave communication, satellite communication, or the like.

The image capturing device 933 is a device that captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933 may capture a still image or a moving image.

The sensor 935 is, for example, various sensors such as an acceleration sensor, a gyro sensor, a geomagnetic sensor, an optical sensor, and a sound sensor. The sensor 935 acquires information on the state of the information processing system 10 such as the attitude of the casing of the information processing system 10, and acquires information on the surrounding environment of the information processing system 10 such as brightness or noise around the information processing system 10. The sensor 935 may also include a GPS sensor that receives global positioning system (GPS) signals and measures the latitude, longitude, and altitude of the device.

The above description is given as to the example of the hardware configuration of the information processing system 10. Each of the components described above may be configured using a general-purpose member, or may be configured with hardware dedicated to the function of each component. This configuration can be changed appropriately depending on the technical level at the time of implementation.

2. CONCLUSION

According to the embodiment of the present disclosure as described above, there is provided the information processing system that includes the mode control portion configured to switch the information input mode from the character-unit input mode to the phrase-unit input mode in the case where a predetermined first trigger is detected when the character-unit input mode is executed as the information input mode. This configuration makes it possible to perform information input to the user more flexibly.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The above description is given as to the modified example of the display form of the output portion 130, but the display form of the output portion 130 is not limited to the above example. The output portion 130 may be, for example, a display provided in a wearable terminal (e.g., a watch or glasses) other than the head mounted display. In addition, the output portion 130 may be, for example, a display provided in an in-vehicle navigation system. In addition, the output portion 130 may be, for example, a display used in the healthcare field.

Furthermore, it is possible to create a program for causing the hardware such as CPU, ROM and RAM incorporated in the computer to execute functions equivalent to those of the information processing device 140 as described above. In addition, a computer-readable recording medium on which the program is recorded can also be provided.

Furthermore, the output control portion 147 generates the display control information for displaying the display content on the output portion 130 and outputs the generated display control information to the output portion 130, and thus the output control portion 147 can control the output portion 130 so that the output portion 130 displays the contents to be displayed. The contents of the display control information may be changed appropriately in accordance with the system configuration.

Specifically, the program used to implement the information processing device 140 may be, for example, a web application. In such a case, the display control information may be created using markup languages such as hypertext markup language (HTML), standard generalized markup language (SGML), and extensible markup language (XML).

The position of each component is not limited to a particular position as long as the operation of the information processing system 10 described above is performed. In one specific example, the image input portion 110, the operation input portion 115, the sound collection portion 120, and the output portion 130 may be provided in a device different from a device provided with the information processing device 140, which are connected via a network. In this case, the information processing device 140 corresponds to, for example, a server such as a web server or a cloud server, and the image input portion 110, the operation input portion 115, the sound collection portion 120, and the output portion 130 may correspond to a client connected to the server via a network.

Further, all the components in the information processing device 140 are not necessarily included in the same device. In one example, some of the input image acquisition portion 141, the sound information acquisition portion 142, the operation detection portion 143, the mode control portion 144, the recognition control portion 145, the speech recognition portion 146, and the output control portion 147 may be provided in a device different from the information processing device 140. In one example, the speech recognition portion 146 may be provided in a server different from the information processing device 140 that includes the input image acquisition portion 141, the sound information acquisition portion 142, the operation detection portion 143, the recognition control portion 145, and the output control portion 147.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a mode control portion configured to switch an information input mode from a character-unit input mode to a phrase-unit input mode in a case where a predetermined first trigger is detected when the character-unit input mode is executed as the information input mode.

(2)

The information processing system according to (1), further including:

a recognition control portion configured to cause a speech recognition portion to perform speech recognition processing on sound information acquired from a sound collection portion when a predetermined speech input mode included in the phrase-unit input mode is executed as the information input mode.

(3)

The information processing system according to (2), further including:

an output control portion configured to cause an output portion to output a result of the speech recognition processing in units of phrases when the speech input mode included in the phrase-unit input mode is executed as the information input mode.

(4)

The information processing system according to (3), in which the output control portion causes the output portion to output input information obtained from an operation input portion in units of characters when the character-unit input mode is executed as the information input mode.

(5)

The information processing system according to any one of (2) to (4), in which the first trigger includes a predetermined speech input start trigger.

(6)

The information processing system according to (5), in which the speech input start trigger includes a predetermined speech input start operation by a user.

(7)

The information processing system according to (5) or (6), in which the speech input start trigger includes an event in which sound information having speech likeness exceeding a threshold is acquired from the sound collection portion.

(8)

The information processing system according to any one of (2) to (7), in which the mode control portion switch the information input mode from the phrase-unit input mode to the character-unit input mode in a case where a predetermined second trigger is detected when the phrase-unit input mode is executed as the information input mode.

(9)

The information processing system according to (8), in which the second trigger includes a predetermined speech input end trigger.

(10)

The information processing system according to (9), in which the speech input end trigger includes a predetermined speech input end operation by a user.

(11)

The information processing system according to (9) or (10), in which the speech input end trigger includes an event in which the speech recognition processing is completed.

(12)

The information processing system according to any one of (2) to (11), in which the phrase-unit input mode includes at least one of a phrase-unit insertion mode in which a result of the speech recognition processing is inserted into an inter-phrase position where a cursor is placed, a phrase-unit overwrite mode in which a phrase at the position where the cursor is placed is overwritten with a result of the speech recognition processing, and a phrase-unit replacement mode in which a phrase at the position where the cursor is placed is replaced with a replacement candidate.

(13)

The information processing system according to (12), in which the mode control portion switches the information input mode from the phrase-unit insertion mode to the phrase-unit overwrite mode in a case where the cursor is moved on a phrase.

(14)

The information processing system according to (12) or (13), in which the mode control portion switches the information input mode from the phrase-unit overwrite mode to the phrase-unit insertion mode in a case where the cursor is moved to an inter-phrase position.

(15)

The information processing system according to any one of (12) to (14), in which the mode control portion switches the information input mode from the phrase-unit overwrite mode to the phrase-unit replacement mode in a case where the result of the speech recognition processing is acquired.

(16)

The information processing system according to any one of (12) to (15),
in which the mode control portion switches the information input mode from the phrase-unit replacement mode to the phrase-unit overwrite mode in a case where a predetermined overwrite start trigger is detected.

(17)

The information processing system according to any one of (12) to (16),
in which the mode control portion switches the information input mode from the phrase-unit replacement mode to the phrase-unit insertion mode in a case where a predetermined insertion start trigger is detected.

(18)

The information processing system according to any one of (12) to (17),
in which the mode control portion switches the information input mode from the phrase-unit insertion mode to the phrase-unit replacement mode in a case where the result of the speech recognition processing is acquired.

(19)

The information processing system according to (3) or (4),
in which the output control portion arranges identification information corresponding to an inter-phrase position or a phrase, and moves a cursor to the inter-phrase position or the phrase corresponding to the identification information in a case where the identification information is recognized as the result of the speech recognition processing.

(20)

An information processing method including:
switching, by a processor, an information input mode from a character-unit input mode to a phrase-unit input mode in a case where a predetermined first trigger is detected when the character-unit input mode is executed as the information input mode.

REFERENCE SIGNS LIST 10 information processing system
110 image input portion
115 operation input portion
120 sound collection portion
130 output portion
140 controller (information processing device)
141 input image acquisition portion
142 sound information acquisition portion
143 operation detection portion
144 mode control portion
145 recognition control portion
146 speech recognition portion
147 output control portion

The invention claimed is:

1. An information processing system, comprising:
at least one processor configured to:
switch an information input mode from a character-unit input mode to a phrase-unit input mode based on a detection of a speech input start trigger; and
control a display device to replace a character-unit input screen of the character-unit input mode with a phrase-unit input screen of the phrase-unit input mode based on the switch from the character-unit input mode to the phrase-unit input mode, wherein
in the character-unit input mode, the at least one processor is further configured to:
obtain input information from a touch panel; and
output, to the display device, the input information in units of character, and
in the phrase-unit input mode, the at least one processor is further configured to:
acquire sound information from a sound collection portion;
perform speech recognition on the acquired sound information; and
output, to the display device, a result of the speech recognition in units of phrase.

2. The information processing system according to claim 1, wherein the speech input start trigger includes a speech input start user operation.

3. The information processing system according to claim 1, wherein the speech input start trigger includes an event in which a speech likeness of the acquired sound information exceeds a threshold value.

4. The information processing system according to claim 1, wherein the at least one processor is further configured to:
switch the information input mode from the phrase-unit input mode to the character-unit input mode based on a detection of a speech input end trigger.

5. The information processing system according to claim 4, wherein the speech input end trigger includes one of a speech input end voice command or a speech input end gesture.

6. The information processing system according to claim 4, wherein the speech input end trigger includes a speech input end user operation.

7. The information processing system according to claim 4, wherein the speech input end trigger includes completion of the speech recognition on the acquired sound information.

8. The information processing system according to claim 1, wherein
the phrase-unit input mode includes at least one of a phrase-unit insertion mode, a phrase-unit overwrite mode, or a phrase-unit replacement mode,
in the phrase-unit insertion mode, the result of the speech recognition is inserted into an inter-phrase position where a cursor is placed,
in the phrase-unit overwrite mode, a phrase at a position where the cursor is placed is overwritten with the result of the speech recognition, and
in the phrase-unit replacement mode, the phrase at the position where the cursor is placed is replaced with a replacement candidate.

9. The information processing system according to claim 8, wherein the at least one processor is further configured to switch the information input mode from the phrase-unit insertion mode to the phrase-unit overwrite mode based on a movement of the cursor on the phrase.

10. The information processing system according to claim 8, wherein the at least one processor is further configured to switch the information input mode from the phrase-unit overwrite mode to the phrase-unit insertion mode based on a movement of the cursor to the inter-phrase position.

11. The information processing system according to claim 8, wherein the at least one processor is further configured to switch the information input mode from the phrase-unit overwrite mode to the phrase-unit replacement mode based on an acquisition of the result of the speech recognition.

12. The information processing system according to claim 8, wherein the at least one processor is further configured to switch the information input mode from the phrase-unit replacement mode to the phrase-unit overwrite mode based on the result of the speech recognition and a detection of an overwrite start trigger.

13. The information processing system according to claim 8, wherein the at least one processor is further configured to switch the information input mode from the phrase-unit replacement mode to the phrase-unit insertion mode based on a detection of an insertion start trigger.

14. The information processing system according to claim 8, wherein the at least one processor is further configured to switch the information input mode from the phrase-unit insertion mode to the phrase-unit replacement mode based on an acquisition of the result of the speech recognition.

15. The information processing system according to claim 1, wherein the at least one processor is further configured to:
arrange identification information corresponding to one of an inter-phrase position or a phrase; and
move a cursor to the one of the inter-phrase position or the phrase corresponding to the identification information based on recognition of the identification information as the result of the speech recognition.

16. An information processing method, comprising:
switching, by a processor, an information input mode from a character-unit input mode to a phrase-unit input mode based on a detection of a speech input start trigger; and
controlling a display device to replace a character-unit input screen of the character-unit input mode with a phrase-unit input screen of the phrase-unit input mode based on the switch from the character-unit input mode to the phrase-unit input mode, wherein in the character-unit input mode:
obtaining, by the processor, input information from a touch panel; and
outputting, by the processor, the input information to the display device in units of character, and
in the phrase-unit input mode:
acquiring, by the processor, sound information from a sound collection portion;
performing, by the processor, speech recognition on the acquired sound information; and
outputting, by the processor, a result of the speech recognition to the display device in units of phrase.

17. The information processing system according to claim 1, wherein the speech input start trigger includes one of a speech input start voice command or a speech input start gesture.

* * * * *